(12) United States Patent
Robert et al.

(10) Patent No.: US 12,464,160 B2
(45) Date of Patent: Nov. 4, 2025

(54) METHODS AND APPARATUSES FOR VIDEO ENCODING AND VIDEO DECODING

(71) Applicant: InterDigital VC Holdings, Inc., Wilmington, DE (US)

(72) Inventors: Antoine Robert, Cesson-Sevigne (FR); Fabrice Leleannec, Cesson-Sevigne (FR); Tangi Poirier, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 47 days.

(21) Appl. No.: 16/753,763

(22) PCT Filed: Oct. 4, 2018

(86) PCT No.: PCT/US2018/054318
§ 371 (c)(1),
(2) Date: Apr. 4, 2020

(87) PCT Pub. No.: WO2019/070944
PCT Pub. Date: Apr. 11, 2019

(65) Prior Publication Data
US 2020/0288166 A1    Sep. 10, 2020

(30) Foreign Application Priority Data

Oct. 5, 2017    (EP) .................................... 17306336

(51) Int. Cl.
*H04N 19/56*    (2014.01)
*H04N 19/105*    (2014.01)
(Continued)

(52) U.S. Cl.
CPC ........... *H04N 19/56* (2014.11); *H04N 19/105* (2014.11); *H04N 19/139* (2014.11); *H04N 19/176* (2014.11)

(58) Field of Classification Search
CPC .... H04N 19/56; H04N 19/105; H04N 19/138; H04N 19/176
See application file for complete search history.

(56) References Cited

U.S. PATENT DOCUMENTS

2014/0241434 A1    8/2014  Lin et al.
2016/0337662 A1    11/2016 Pang et al.
(Continued)

FOREIGN PATENT DOCUMENTS

CN    103907346 A    7/2014
CN    104935938 A    9/2015
(Continued)

OTHER PUBLICATIONS

Karczewicz et al., "JVET AHG report: Tool evaluation (AHG1)", Joint Video Exploration Team (JVET) of ITU-T SG 16 WP 3 and ISO/IEC JTC 1/SC 29/WG 11, Document JVET-G0001, 7th meeting, Torino, Italy, Jul. 13, 2017, 6 pages.

(Continued)

*Primary Examiner* — Jeremiah C Hallenbeck-Huber
(74) *Attorney, Agent, or Firm* — Condo Roccia Koptiw LLP

(57) ABSTRACT

Implementations are described for determining, for a block being encoded in a picture, at least one predictor candidate, determining for the at least one predictor candidate, one or more corresponding control point generator motion vectors, based on motion information associated to the at least one predictor candidate, determining for the block being encoded, one or more corresponding control point motion vectors, based on the one or more corresponding control point generator motion vectors determined for the at least one predictor candidate, determining, based on the one or more corresponding control point motion vectors deter- (Continued)

1700 determining one or more corresponding control point motion vectors associated to the predictor candidate, based on at least two motion vectors associated respectively to at least two sub-blocks of the predictor candidate    — 1710 verifying that the one or more corresponding control point motion vectors associated to the predictor candidate satisfies an affine motion model    — 1720 mined for the block, a corresponding motion field, and encoding the block based on the corresponding motion field.

22 Claims, 18 Drawing Sheets

(51) Int. Cl.
*H04N 19/139* (2014.01)
*H04N 19/176* (2014.01)

(56) References Cited

U.S. PATENT DOCUMENTS

| | | | | |
|---|---|---|---|---|
| 2017/0332095 | A1* | 11/2017 | Zou | H04N 19/513 |
| 2018/0014017 | A1* | 1/2018 | Li | H04N 19/127 |
| 2018/0324454 | A1* | 11/2018 | Lin | H04N 19/159 |
| 2019/0082191 | A1* | 3/2019 | Chuang | H04N 19/176 |

FOREIGN PATENT DOCUMENTS

| | | | |
|---|---|---|---|
| JP | 2004364333 A | 12/2004 | |
| TW | 201701671 A | 1/2017 | |
| WO | 2017118409 A1 | 7/2017 | |
| WO | WO 2017148345 A1 | 9/2017 | |
| WO | WO 2017157259 A1 | 9/2017 | |

OTHER PUBLICATIONS

Huang et al., "Affine SKIP and DIRECT Modes for Efficient Video Coding", 2012 Conference on Visual Communications and Image Processing, San Diego, California, USA, Nov. 27, 2012, 6 pages.
Chen et al., "Algorithm Description of Joint Exploration Test Model 2", Joint Video Exploration Team (JVET) of ITU-T SG16 WP3 and ISO/IEC JTC1/SC29/WG11, Document: JVET-B1001 v3, 2nd Meeting, San Diego, California, USA, Feb. 20, 2016, 32 pages.
Chen et al., "Algorithm Description of Joint Exploration Test Model 6 (JEM 6)", Joint Video Exploration Team (JVET) of ITU-T SG 16 WP 3 and ISO/IEC JTC 1/SC 29/WG 11, Document JVET-F1001-v2, 6th meeting, Hobart, Australia, Mar. 31, 2017, 49 pages.
Anonymous, "Reference software for ITU-T H.265 high efficiency video coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.265.2, Oct. 2014, pp. 1-12.
Anonymous, "Affine transform prediction for next generation video coding", Study Group 16—Contribution 1016, Huawei Technologies Co., Ltd., International Telecommunication Union Telecommunication Standardization Sector, Study Period 2013-2016, COM xxx-C1016-E, Oct. 2015, 11 pages.
Li et al., "An Affine Motion Compensation Framework for High Efficiency Video Coding", 2015 IEEE International Symposium on Circuits and Systems (ISCAS), Lisbon, Portugal, May 24, 2015, pp. 525-528.
Chen et al., "Algorithm Description of Joint Exploration Test Model 5 (JEM 5)", JVET-E1001-V2, Editors, Joint Video Exploration Team (JVET) of ITU-T SG 16 WP 3 and ISO/IEC JTC 1/SC 29/WG 11, 5th Meeting: Geneva, CH, Jan. 12-20, 2017, 45 pages.
English Language Translation, Chinese Publication No. CN 104935938 A.
English Language Translation, Japanese Publication No. JP 2004364333 A.
Chen, et al., "Algorithm Description of Joint Exploration Test Model 6 (JEM 6)", JVET-F1001-V3, Editors, Joint Video Exploration Team (JVET) of ITU-T SG 16 WP3 and ISO/IEC JTC 1/SC 29/WG 11, 6th Meeting: Hobart, AU, Mar. 31-Apr. 7, 2017, 50 pages.
Huawei Technologies, "Affine transform prediction for next generation video coding", ITU-T SG16 Meeting; Dec. 10, 2015-Oct. 23, 2015; Geneva, No. T13-SG16-C-1016, XP030100743, Sep. 29, 2015, pp. 1-11.
Chen, et al., "Description of SDR, HDR and 360° video coding technology proposal by Qualcomm and Technicolor—low and high complexity versions", JVET of ITU-T SG 16 WP 3 and ISO/IEC JTC 1/SC 29/WG 11; 10th Meeting: San Diego, US; Qualcomm, Technicolor; JVET-J0021, Apr. 10-20, 2018, pp. 1-43.

* cited by examiner

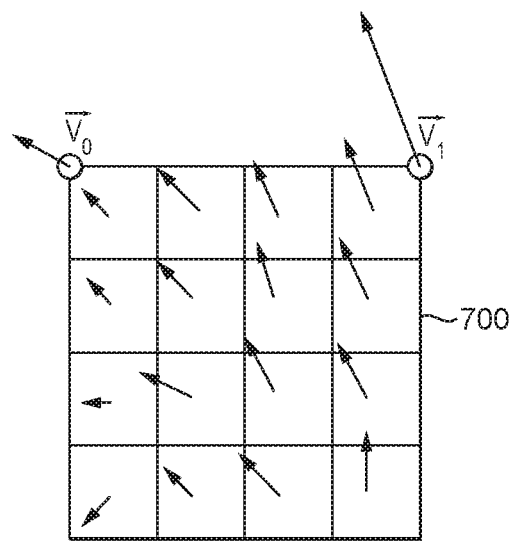
FIG. 7
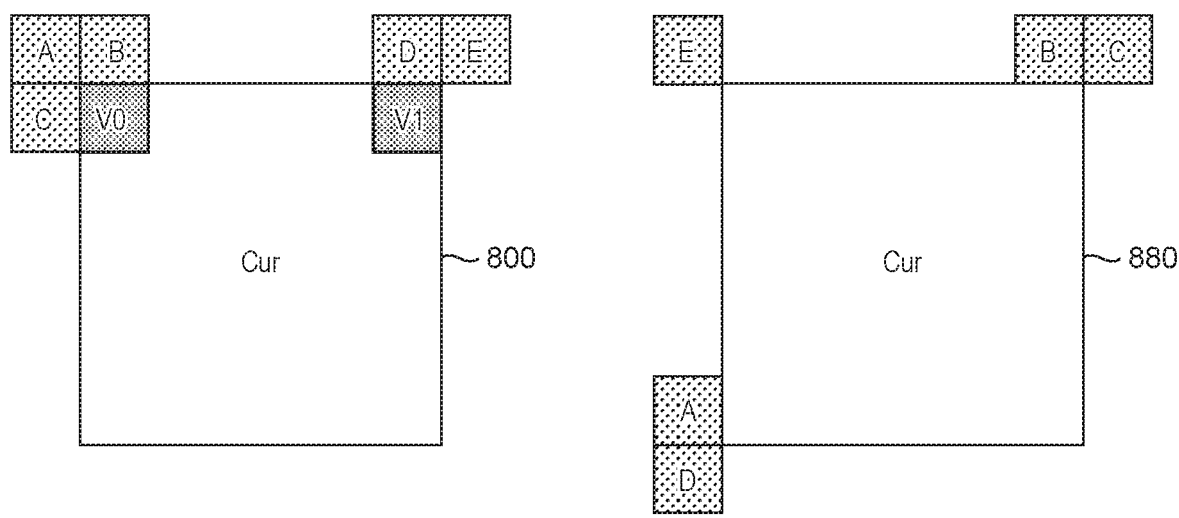
FIG. 8A
FIG. 8B

METHODS AND APPARATUSES FOR VIDEO ENCODING AND VIDEO DECODING

CROSS REFERENCE TO RELATED APPLICATIONS

This application is the national stage entry under 35 U.S.C. § 371 of International Application PCT/US2018/054318, filed Oct. 4, 2018 which was published in accordance with PCT Article 21 (2) on Apr. 11, 2019, in English, and which claims the benefit of European patent application No. 17306336.3, filed Oct. 5, 2017.

TECHNICAL FIELD

At least one of the present embodiments generally relates to, e.g., a method or an apparatus for video encoding or decoding, and more particularly, to a method or an apparatus for selecting a predictor candidate from a set of predictor candidates for motion compensation based on a motion model such as, e.g., an affine model, for a video encoder or a video decoder.

BACKGROUND

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

A recent addition to high compression technology includes using a motion model based on affine modeling. In particular, affine modeling is used for motion compensation for encoding and decoding of video pictures. In general, affine modeling is a model using at least two parameters such as, e.g., two control point motion vectors (CPMVs) representing the motion at the respective corners of a block of picture, that allows deriving a motion field for the whole block of a picture to simulate, e.g., rotation and homothety (zoom).

SUMMARY

According to a general aspect of at least one embodiment, a method for video encoding is disclosed. The method for video encoding comprises:
  determining, for a block being encoded in a picture, at least one predictor candidate;
  determining for the at least one predictor candidate, one or more corresponding control point generator motion vectors, based on motion information associated to the at least one predictor candidate;
  determining for the block being encoded, one or more corresponding control point motion vectors, based on the one or more corresponding control point generator motion vectors determined for the at least one predictor candidate;
  determining, based on the one or more corresponding control point motion vectors determined for the block, a corresponding motion field, wherein the corresponding motion field identifies motion vectors used for prediction of sub-blocks of the block being encoded;
  encoding the block based on the corresponding motion field.

According to another general aspect of at least one embodiment, a method for video decoding is disclosed. The method for video decoding comprises:
  determining, for a block being decoded in a picture, a predictor candidate;
  determining for the predictor candidate, one or more corresponding control point generator motion vectors, based on motion information associated to the at least one predictor candidate;
  determining for the block being decoded, one or more corresponding control point motion vectors, based on the one or more corresponding control point generator motion vectors determined for the predictor candidate;
  determining, based on the one or more corresponding control point motion vectors determined for the block, a corresponding motion field, wherein the corresponding motion field identifies motion vectors used for prediction of sub-blocks of the block being decoded;
  decoding the block based on the corresponding motion field.

According to another general aspect of at least one embodiment, an apparatus for video encoding is disclosed. Such an encoding apparatus comprises:
  means for determining, for a block being encoded in a picture, at least one predictor candidate;
  means for determining for the at least one predictor candidate, one or more corresponding control point generator motion vectors, based on motion information associated to the at least one predictor candidate;
  means for determining for the block being encoded, one or more corresponding control point motion vectors, based on the one or more corresponding control point generator motion vectors determined for the at least one predictor candidate;
  means for determining, based on the one or more corresponding control point motion vectors determined for the block, a corresponding motion field, wherein the corresponding motion field identifies motion vectors used for prediction of sub-blocks of the block being encoded;
  means for encoding the block based on the corresponding motion field.

According to another general aspect of at least one embodiment, an apparatus for video decoding is disclosed, wherein the decoding apparatus comprises:
  means for determining, for a block being decoded in a picture, a predictor candidate;
  means for determining for the predictor candidate, one or more corresponding control point generator motion vectors, based on motion information associated to the at least one predictor candidate;
  means for determining for the block being decoded, one or more corresponding control point motion vectors, based on the one or more corresponding control point generator motion vectors determined for the predictor candidate;
  means for determining, based on the one or more corresponding control point motion vectors determined for the block, a corresponding motion field, wherein the corresponding motion field identifies motion vectors used for prediction of sub-blocks of the block being decoded;

means for decoding the block based on the corresponding motion field.

According to at least one embodiment, motion information associated to the predictor candidate corresponds to a non affine motion information. In this way, prediction of affine motion model is improved by using non affine motion model. A non affine motion model is a translational motion model wherein only one motion vector representative of a translation is coded in the model. The number of candidate predictors for predicting an affine motion model is increased, thus improving compression efficiency.

According to at least one embodiment, the predictor candidate is comprised in a set of predictor candidates and for the block being encoded/decoded, an index corresponding to the predictor candidate in the set of predictor candidates is encoded at the encoder or received by the decoder.

According to at least one embodiment, determining for the predictor candidate, one or more corresponding control point generator motion vectors, based on motion information associated to the predictor candidate, comprises:
  determining one or more corresponding control point associated to the predictor candidate, based on motion information associated to the predictor candidate,
  determining the one or more corresponding control point generator motion vectors from the one or more corresponding control point associated to the predictor candidate.

According to this embodiment, an affine motion model is estimated for the predictor candidate based on motion information associated to the predictor candidate.

According to at least one embodiment, the one or more corresponding control point generator motion vectors comprise a motion vector $\vec{v_2}$ of a top left corner of the predictor candidate, a motion vector $\vec{v_3}$ of an above right corner of the predictor candidate, and a motion vector $\vec{v_4}$ of a left bottom corner of the predictor candidate, and wherein the one or more corresponding control point motion vectors for the block comprise a motion vector $\vec{v_0}$ of a top left corner of the block and a motion vector $\vec{v_1}$ of an above right corner of the block, and wherein motion vector $\vec{v_0}$ and $\vec{v_1}$ are determined by:

$$\vec{v_0} = \vec{v_2} + (\vec{v_4} - \vec{v_2})\left(\frac{Y_{curr} - Y_{neighb}}{H_{neighb}}\right) + (\vec{v_3} - \vec{v_2})\left(\frac{X_{curr} - X_{neighb}}{W_{neighb}}\right)$$

$$\vec{v_1} = \vec{v_0} + (\vec{v_3} - \vec{v_2})\left(\frac{W_{curr}}{W_{neighb}}\right),$$

where $Y_{curr}$, $Y_{neighb}$ are respectively the vertical position of the block and the predictor candidate in the picture, $X_{curr}$, $X_{neighb}$ are respectively the horizontal position of the block and the predictor candidate in the picture, $W_{curr}$ is the horizontal size of the block and $W_{neighb}$, $H_{neighb}$ are respectively the horizontal and vertical size of the predictor candidate.

According to at least one embodiment, the predictor candidate comprises one or more sub-blocks, each sub-block being associated to at least one motion vector, and determining for the predictor candidate, one or more corresponding control point associated to the predictor candidate, based on motion information associated to the predictor candidate comprises determining one or more corresponding control point motion vectors associated to the predictor candidate, based on at least two motion vectors associated respectively to at least two sub-blocks of the predictor candidate, and verifying that the one or more corresponding control point motion vectors associated to the predictor candidate satisfies an affine motion model.

According to this embodiment, determining one or more corresponding control point associated to the predictor candidate, based on motion information associated to the predictor candidate is simple and does not does not imply high computations. According to this embodiment, it is verified that the motion model provided by sub-blocks of the predictor candidate satisfies an affine motion model.

According to at least one embodiment, the predictor candidate comprises one or more sub-blocks, each sub-block being associated to at least one motion vector, and determining for the predictor candidate, one or more corresponding control point associated to the predictor candidate, based on motion information associated to the predictor candidate comprises determining, for at least two distinct sets of at least three sub-blocks of the predictor candidate, one or more corresponding control point motion vectors for the predictor candidate associated respectively to the at least two sets, based on the motion vectors associated respectively to the at least three sub-blocks of each set, and calculating one or more corresponding control point motion vectors associated to the predictor candidate by averaging the determined one or more corresponding control point motion vectors associated to each set.

According to this embodiment, multiple sets of one or more corresponding control point motion vectors are determined for the predictor candidate based on motion vectors associated to sub-blocks of the predictor candidate. Multiple distinct sets of sub-blocks are used. The one or more corresponding control point motion vectors for the predictor candidate are then calculated by averaging the determined one or more corresponding control point motion vectors from each sets.

According to at least one embodiment, a control point generator motion vector ($v_x$, $v_y$) at position (x, y) is determined from one or more corresponding control point motion vectors associated to the predictor candidate by:

$$\begin{cases} v_x = \dfrac{(v_{1x} - v_{0x})}{w}x - \dfrac{(v_{1y} - v_{0y})}{w}y + v_{0x} \\ v_y = \dfrac{(v_{1y} - v_{0y})}{w}x + \dfrac{(v_{1x} - v_{0x})}{w}y + v_{0y} \end{cases}$$

wherein ($v_{0x}$, $v_{0y}$) corresponds to the control point motion vector of the top-left corner of the predictor candidate, ($v_{1x}$, $v_{1y}$) corresponds to the control point motion vector of the top-right corner of the predictor candidate, w is the width of the predictor candidate.

According to at least one embodiment, motion information associated to predictor candidate is derived from:
  a bilateral template matching between two reference blocks in respectively two reference frames,
  a reference block of a reference frame identified by motion information of a first spatial neighboring block of the predictor candidate,
  an average of motion vectors of spatial and temporal neighboring blocks of the predictor candidate.

According to another general aspect of at least one embodiment, a non-transitory computer readable medium is presented containing data content generated according to the method or the apparatus of any of the preceding descriptions.

According to another general aspect of at least one embodiment, a signal is provided comprising video data generated according to the method or the apparatus of any of the preceding descriptions.

One or more of the present embodiments also provide a computer readable storage medium having stored thereon instructions for encoding or decoding video data according to any of the methods described above. The present embodiments also provide a computer readable storage medium having stored thereon a bitstream generated according to the methods described above. The present embodiments also provide a method and apparatus for transmitting the bitstream generated according to the methods described above. The present embodiments also provide a computer program product including instructions for performing any of the methods described.

BRIEF DESCRIPTION OF THE DRAWINGS

FIG. 7 illustrates an example of 4×4 sub-CU based affine motion vector field used in Joint Exploration Model (JEM).

FIG. 8A illustrates an example of motion vector prediction candidates for Affine Inter CUs.

FIG. 8B illustrates an example of motion vector prediction candidates in the Affine Merge mode.

DETAILED DESCRIPTION

Figure 1:
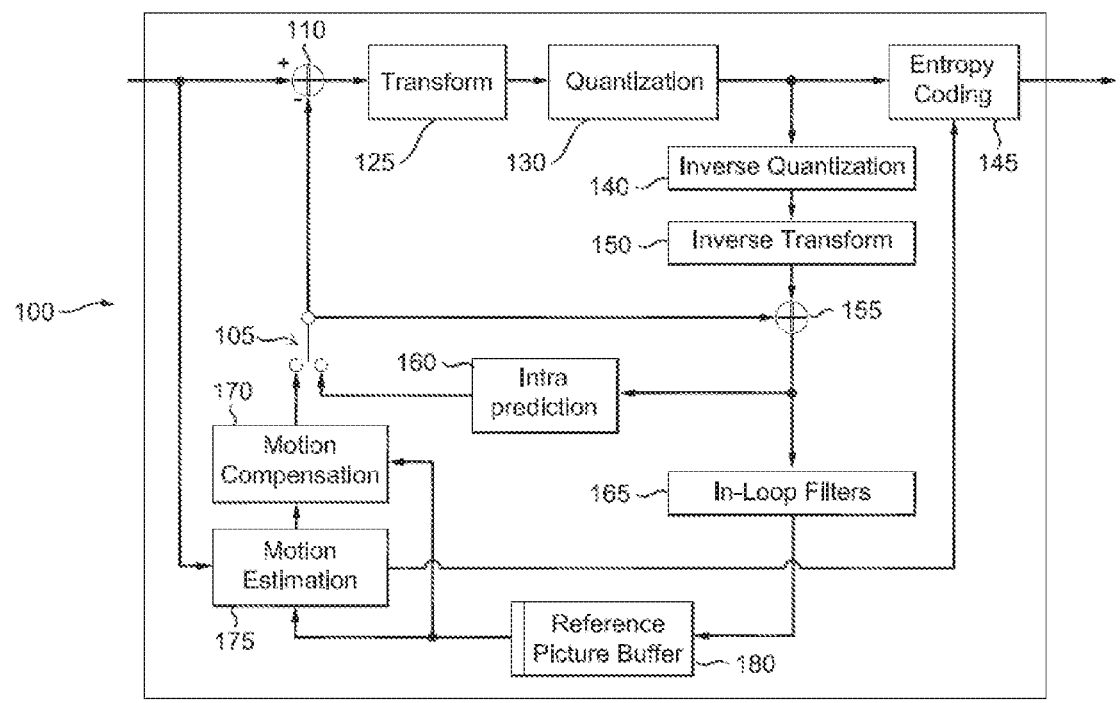
FIG. 1 illustrates a block diagram of an embodiment of an HEVC (High Efficiency Video Coding) video encoder.

FIG. 1 illustrates an exemplary High Efficiency Video Coding (HEVC) encoder 100. HEVC is a compression standard developed by Joint Collaborative Team on Video Coding (JCT-VC) (see, e.g., "ITU-T H.265 TELECOMMUNICATION STANDARDIZATION SECTOR OF ITU (October 2014), SERIES H: AUDIOVISUAL AND MULTIMEDIA SYSTEMS, Infrastructure of audiovisual services—Coding of moving video, High efficiency video coding, Recommendation ITU-T H.265").

In HEVC, to encode a video sequence with one or more pictures, a picture is partitioned into one or more slices where each slice can include one or more slice segments. A slice segment is organized into coding units, prediction units, and transform units.

In the present application, the terms "reconstructed" and "decoded" may be used interchangeably, the terms "encoded" or "coded" may be used interchangeable, and the terms "picture" and "frame" may be used interchangeably. Usually, but not necessarily, the term "reconstructed" is used at the encoder side while "decoded" is used at the decoder side.

The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

For coding, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block, and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB, and TB of the luma component applies to the corresponding CU, PU, and TU. In the present application, the term "block" can be used to refer, for example, to any of CTU, CU, PU, TU, CB, PB, and TB. In addition, the "block" can also be used to refer to a macroblock and a partition as specified in H.264/AVC or other video coding standards, and more generally to refer to an array of data of various sizes.

In the exemplary encoder 100, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU, and indicates the intra/inter decision by a prediction mode flag. Prediction residuals are calculated by subtracting (110) the predicted block from the original image block.

CUs in intra mode are predicted from reconstructed neighboring samples within the same slice. A set of 35 intra prediction modes is available in HEVC, including a DC, a planar, and 33 angular prediction modes. The intra prediction reference is reconstructed from the row and column adjacent to the current block. The reference extends over two times the block size in the horizontal and vertical directions using available samples from previously reconstructed blocks. When an angular prediction mode is used for intra prediction, reference samples can be copied along the direction indicated by the angular prediction mode.

The applicable luma intra prediction mode for the current block can be coded using two different options. If the applicable mode is included in a constructed list of three most probable modes (MPM), the mode is signaled by an index in the MPM list. Otherwise, the mode is signaled by a fixed-length binarization of the mode index. The three most probable modes are derived from the intra prediction modes of the top and left neighboring blocks.

For an inter CU, the corresponding coding block is further partitioned into one or more prediction blocks. Inter prediction is performed on the PB level, and the corresponding PU contains the information about how inter prediction is performed. The motion information (i.e., motion vector and reference picture index) can be signaled in two methods, namely, "merge mode" and "advanced motion vector prediction (AMVP)".

In the merge mode, a video encoder or decoder assembles a candidate list based on already coded blocks, and the video encoder signals an index for one of the candidates in the candidate list. At the decoder side, the motion vector (MV) and the reference picture index are reconstructed based on the signaled candidate.

Figures 2A, 2B:
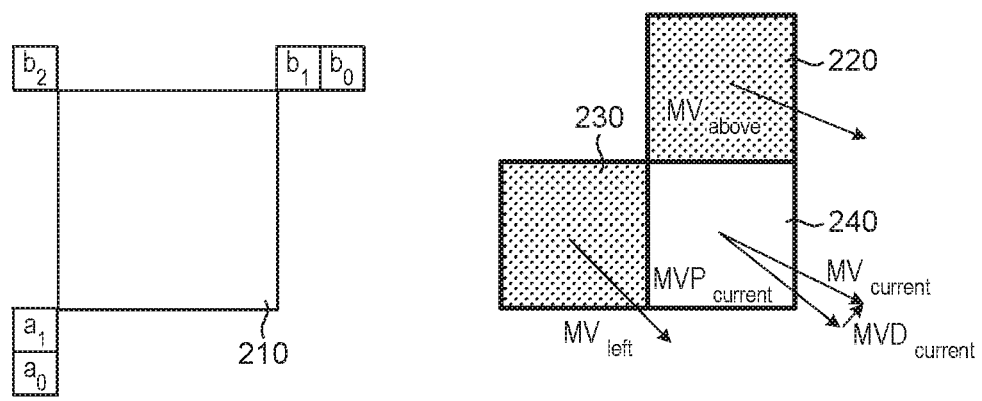
FIG. 2A is a pictorial example depicting HEVC reference sample generation.
FIG. 2B is a pictorial example depicting motion vector prediction in HEVC.

The set of possible candidates in the merge mode consists of spatial neighbor candidates, a temporal candidate, and generated candidates. FIG. 2A shows the positions of five spatial candidates $\{a_1, b_1, b_0, a_0, b_2\}$ for a current block 210, wherein $a_0$ and $a_1$ are to the left of the current block, and $b_1$, $b_0$, $b_2$ are at the top of the current block. For each candidate position, the availability is checked according to the order of $a_1$, $b_1$, $b_0$, $a_0$, $b_2$, and then the redundancy in candidates is removed.

The motion vector of the collocated location in a reference picture can be used for derivation of a temporal candidate. The applicable reference picture is selected on a slice basis and indicated in the slice header, and the reference index for the temporal candidate is set to $i_{ref}=0$. If the POC distance (td) between the picture of the collocated PU and the reference picture from which the collocated PU is predicted from, is the same as the distance (tb) between the current picture and the reference picture containing the collocated PU, the collocated motion vector $mv_{col}$ can be directly used as the temporal candidate. Otherwise, a scaled motion vector, $tb/td*mv_{col}$, is used as the temporal candidate. Depending on where the current PU is located, the collocated PU is determined by the sample location at the bottom-right or at the center of the current PU.

The maximum number of merge candidates, N, is specified in the slice header. If the number of merge candidates is larger than N, only the first N−1 spatial candidates and the temporal candidate are used. Otherwise, if the number of merge candidates is less than N, the set of candidates is filled up to the maximum number N with generated candidates as combinations of already present candidates, or null candidates. The candidates used in the merge mode may be referred to as "merge candidates" in the present application.

If a CU indicates a skip mode, the applicable index for the merge candidate is indicated only if the list of merge candidates is larger than 1, and no further information is coded for the CU. In the skip mode, the motion vector is applied without a residual update.

In AMVP, a video encoder or decoder assembles candidate lists based on motion vectors determined from already coded blocks. The video encoder then signals an index in the candidate list to identify a motion vector predictor (MVP) and signals a motion vector difference (MVD). At the decoder side, the motion vector (MV) is reconstructed as MVP+MVD. The applicable reference picture index is also explicitly coded in the PU syntax for AMVP.

Only two spatial motion candidates are chosen in AMVP. The first spatial motion candidate is chosen from left positions $\{a_0, a_1\}$ and the second one from the above positions $\{b_0, b_1, b_2\}$, while keeping the searching order as indicated in the two sets. If the number of motion vector candidates is not equal to two, the temporal MV candidate can be included. If the set of candidates is still not fully filled, then zero motion vectors are used.

If the reference picture index of a spatial candidate corresponds to the reference picture index for the current PU (i.e., using the same reference picture index or both using long-term reference pictures, independently of the reference picture list), the spatial candidate motion vector is used directly. Otherwise, if both reference pictures are short-term ones, the candidate motion vector is scaled according to the distance (tb) between the current picture and the reference picture of the current PU and the distance (td) between the current picture and the reference picture of the spatial candidate. The candidates used in the AMVP mode may be referred to as "AMVP candidates" in the present application.

For ease of notation, a block tested with the "merge" mode at the encoder side or a block decoded with the "merge" mode at the decoder side is denoted as a "merge" block, and a block tested with the AMVP mode at the encoder side or a block decoded with the AMVP mode at the decoder side is denoted as an "AMVP" block.

FIG. 2B illustrates an exemplary motion vector representation using AMVP. For a current block 240 to be encoded, a motion vector ($MV_{current}$) can be obtained through motion estimation. Using the motion vector ($MV_{left}$) from a left block 230 and the motion vector ($MV_{above}$) from the above block 220, a motion vector predictor can be chosen from MV$_{left}$ and MV$_{above}$ as MVP$_{current}$. A motion vector difference then can be calculated as MVD$_{current}$=MV$_{current}$−MVP$_{current}$.

Motion compensation prediction can be performed using one or two reference pictures for prediction. In P slices, only a single prediction reference can be used for Inter prediction, enabling uni-prediction for a prediction block. In B slices, two reference picture lists are available, and uni-prediction or bi-prediction can be used. In bi-prediction, one reference picture from each of the reference picture lists is used.

In HEVC, the precision of the motion information for motion compensation is one quarter-sample (also referred to as quarter-pel or ¼-pel) for the luma component and one eighth-sample (also referred to as ⅛-pel) for the chroma components for the 4:2:0 configuration. A 7-tap or 8-tap interpolation filter is used for interpolation of fractional-sample positions, i.e., ¼, ½ and ¾ of full sample locations in both horizontal and vertical directions can be addressed for luma.

The prediction residuals are then transformed (125) and quantized (130). The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

Figure 3:
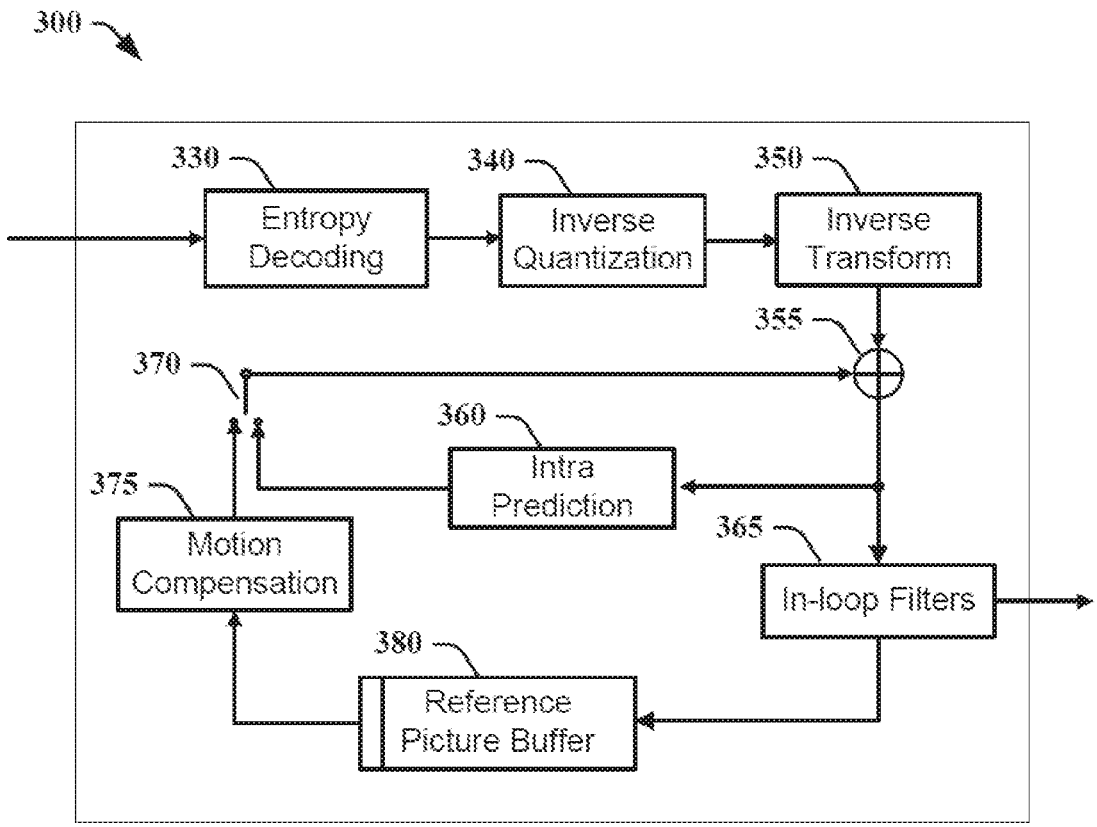
FIG. 3 illustrates a block diagram of an embodiment of an HEVC video decoder.

FIG. 3 illustrates a block diagram of an exemplary HEVC video decoder 300. In the exemplary decoder 300, a bitstream is decoded by the decoder elements as described below. Video decoder 300 generally performs a decoding pass reciprocal to the encoding pass as described in FIG. 1, which performs video decoding as part of encoding video data.

In particular, the input of the decoder includes a video bitstream, which may be generated by video encoder 100. The bitstream is first entropy decoded (330) to obtain transform coefficients, motion vectors, and other coded information. The transform coefficients are de-quantized (340) and inverse transformed (350) to decode the prediction residuals. Combining (355) the decoded prediction residuals and the predicted block, an image block is reconstructed. The predicted block may be obtained (370) from intra prediction (360) or motion-compensated prediction (i.e., inter prediction) (375). As described above, AMVP and merge mode techniques may be used to derive motion vectors for motion compensation, which may use interpolation filters to calculate interpolated values for sub-integer samples of a reference block. In-loop filters (365) are applied to the reconstructed image. The filtered image is stored at a reference picture buffer (380).

Figure 4:
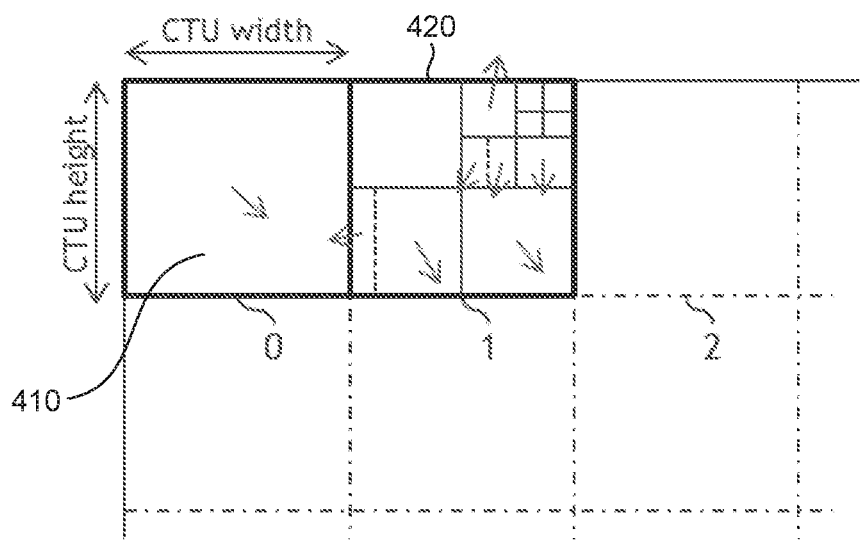
FIG. 4 illustrates an example of Coding Tree Unit (CTU) and Coding Tree (CT) concepts to represent a compressed HEVC picture.
Figure 5:
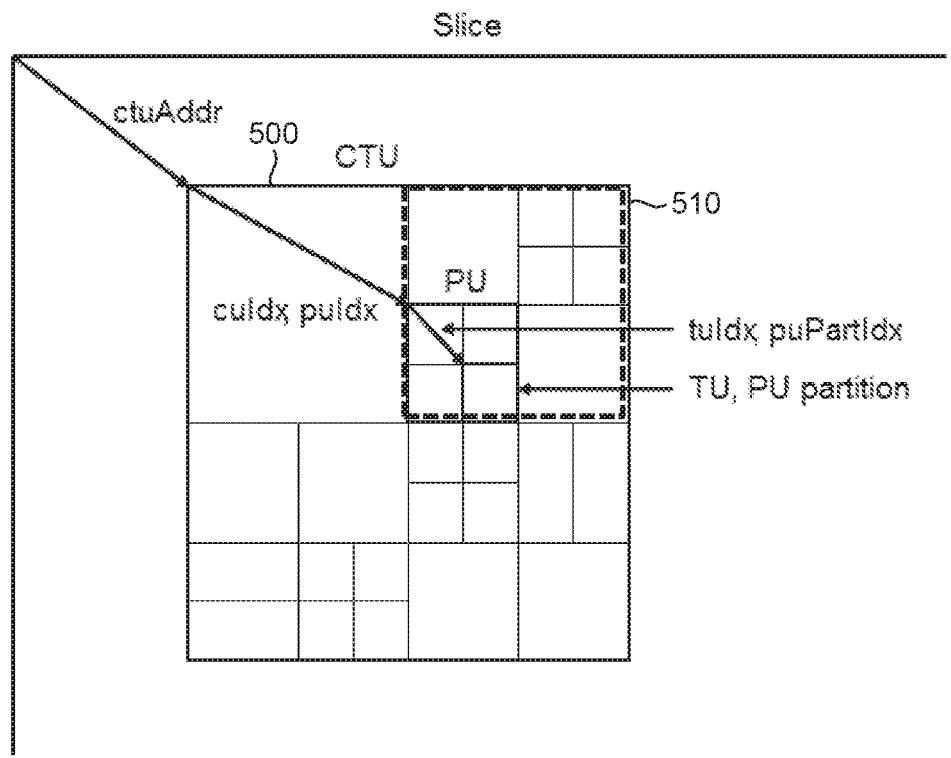
FIG. 5 illustrates an example of divisions of a Coding Tree Unit (CTU) into Coding Units (CUs), Prediction Units (PUs), and Transform Units (TUs).

As mentioned, in HEVC, motion compensated temporal prediction is employed to exploit the redundancy that exists between successive pictures of a video. To do that, a motion vector is associated with each prediction unit (PU). As explained above, each CTU is represented by a Coding Tree in the compressed domain. This is a quad-tree division of the CTU, where each leaf is called a Coding Unit (CU) and is also illustrated in FIG. 4 for CTUs 410 and 420. Each CU is then given some Intra or Inter prediction parameters as prediction information. To do so, a CU may be spatially partitioned into one or more Prediction Units (PUs), each PU being assigned some prediction information. The Intra or Inter coding mode is assigned on the CU level. These concepts are further illustrated in FIG. 5 for an exemplary CTU 500 and a CU 510.

In HEVC, one motion vector is assigned to each PU. This motion vector is used for motion compensated temporal prediction of the considered PU. Therefore, in HEVC, the motion model that links a predicted block and its reference block simply consists of a translation or calculation based on the reference block and the corresponding motion vector.

To make improvements to HEVC, the reference software and/or documentation JEM (Joint Exploration Model) is being developed by the Joint Video Exploration Team (JVET). In one JEM version (e.g., "Algorithm Description of Joint Exploration Test Model 5", Document JVET-E1001_v2, Joint Video Exploration Team of ISO/IEC JTC1/SC29/WG11, 5rd meeting, 12-20 Jan. 2017, Geneva, CH), some further motion models are supported to improve temporal prediction. To do so, a PU can be spatially divided into sub-PUs and a model can be used to assign each sub-PU a dedicated motion vector.

In more recent versions of the JEM (e.g., "Algorithm Description of Joint Exploration Test Model 2", Document JVET-B1001_v3, Joint Video Exploration Team of ISO/IEC JTC1/SC29/WG11, 2rd meeting, 20-26 Feb. 2016, San Diego, USA"), a CU is no longer specified to be divided into PUs or TUs. Instead, more flexible CU sizes may be used, and some motion data are directly assigned to each CU. In this new codec design under the newer versions of JEM, a CU may be divided into sub-CUs and a motion vector may be computed for each sub-CU of the divided CU.

Figure 6:
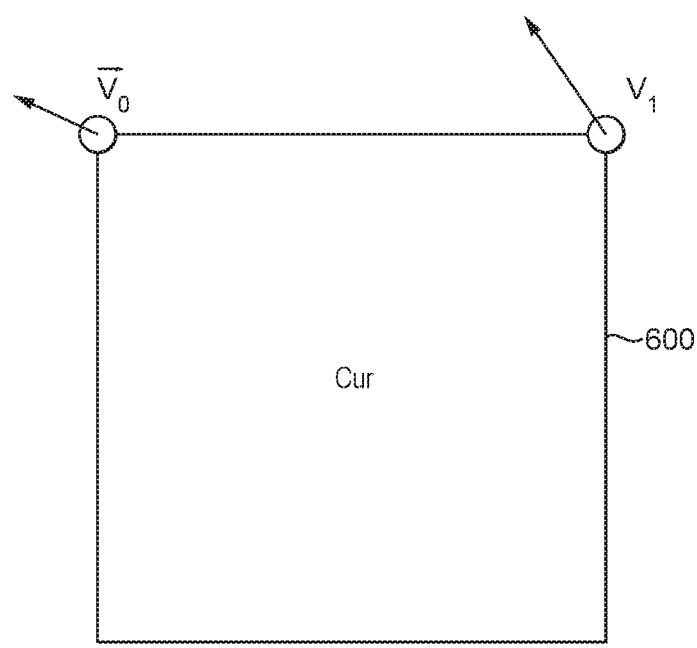
FIG. 6 illustrates an example of an affine model as the motion model used in Joint Exploration Model (JEM).

One of the new motion models introduced in the JEM is the use of an affine model as the motion model to represent the motion vectors in a CU. The motion model used is illustrated by FIG. 6 and is represented by Equation 1 as shown below. The affine motion field comprises the following motion vector component values for each position (x, y) inside the considered block 600 of FIG. 6:

$$\begin{cases} v_x = \dfrac{(v_{1x} - v_{0x})}{w}x - \dfrac{(v_{1y} - v_{0y})}{w}y + v_{0x} \\ v_y = \dfrac{(v_{1y} - v_{0y})}{w}x + \dfrac{(v_{1x} - v_{0x})}{w}y + v_{0y} \end{cases} \quad \text{Equation 1}$$

affine motion model used to generate the motion field inside a CU for prediction, wherein (v$_{0x}$, v$_{0y}$) and (v$_{1x}$, v$_{1y}$) are the control point motion vectors used to generate the corresponding motion field, v$_{0x}$, v$_{0y}$) corresponds to the control point motion vector of the top-left corner of the block being encoded or decoded, (v$_{1x}$, v$_{1y}$) corresponds to the control point motion vector of the top-right corner of the block being encoded or decoded, and w is the width of the block being encoded or decoded.

To reduce complexity, a motion vector is computed for each 4×4 sub-block (sub-CU) of the considered CU 700, as illustrated in FIG. 7. An affine motion vector is computed from the control point motion vectors, for each center position of each sub-block. The obtained MV is represented at 1/16 pel accuracy. As a result, the compensation of a coding unit in the affine mode consists in motion compensated prediction of each sub-block with its own motion vector. These motion vectors for the sub-blocks are shown respectively as an arrow for each of the sub-blocks in FIG. 7.

Affine motion compensation may be used in 2 ways in the JEM: Affine Inter (AF_AMVP) mode and Affine Merge mode. They are introduced in the following sections.

Affine Inter (AF_AMVP) mode: A CU in AMVP mode, whose size is larger than 8×8, may be predicted in Affine Inter mode. This is signaled through a flag in the bit-stream. The generation of the Affine Motion Field for that CU includes determining control point motion vectors (CPMVs), which are obtained by the decoder through the addition of a motion vector differential and a control point motion vector prediction (CPMVP). The CPMVPs are a pair of motion vector candidates, respectively taken from the set (A, B, C) and (D, E) illustrated in FIG. 8A for a current CU 800 being encoded or decoded.

Affine Merge mode: In Affine Merge mode, a CU-level flag indicates if a merge CU employs affine motion compensation. If so, then the first available neighboring CU that has been coded in an Affine mode is selected among the ordered set of candidate positions A, B, C, D, E of FIG. 8B for a current CU 880 being encoded or decoded. Note that this ordered set of candidate positions in JEM is the same as the spatial neighbor candidates in the merge mode in HEVC as shown in FIG. 2A and as explained previously.

Figure 9:
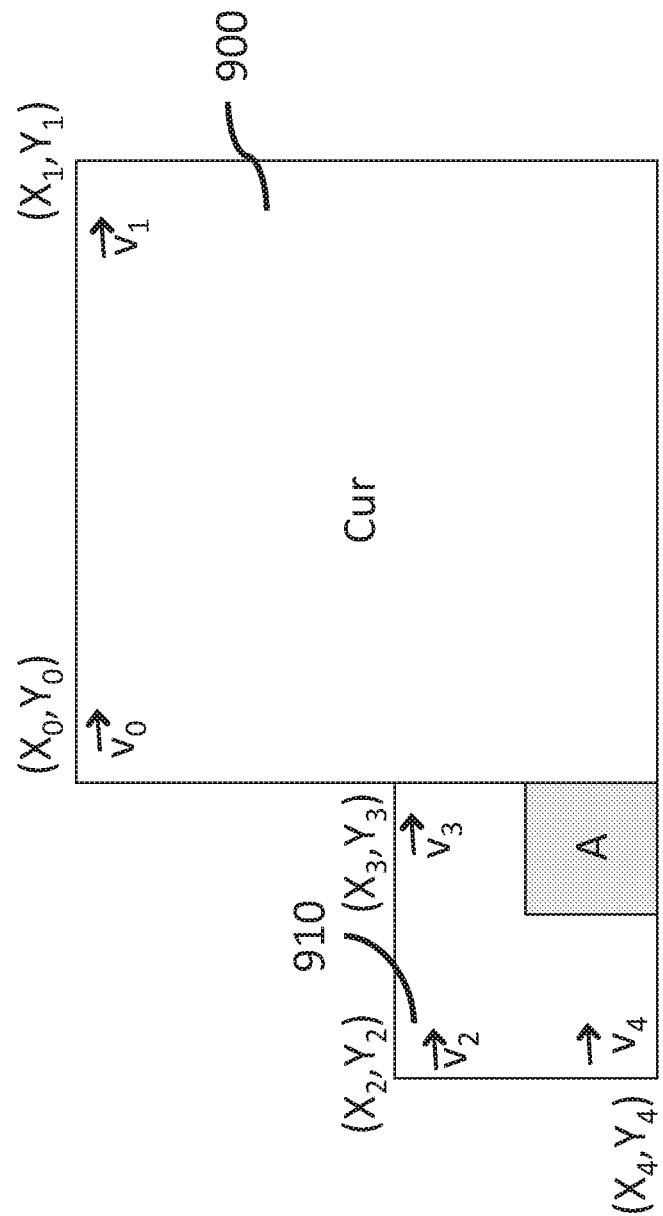
FIG. 9 illustrates an example of spatial derivation of affine control point motion vectors in the case of Affine Merge mode motion model.

Once the first neighboring CU in Affine mode is obtained, then the 3 CPMVs $\vec{v}_2$, $\vec{v}_3$, and $\vec{v}_4$ from the top-left, top-right and bottom-left corners of the neighboring affine CU are retrieved or calculated. For example, FIG. 9 shows that this first determined neighboring CU 910 in Affine mode being in the A position of FIG. 8B for a current CU 900 being encoded or decoded. Based on these three CPMVs of the neighboring CU 910, the two CPMVs of the top-left and top-right corners of the current CU 900 are derived as follows:

derivation of CPMVs of the current CU based on the three control-point motion vectors of the selected neighboring CU $$\vec{v}_0 = \vec{v}_2 + (\vec{v}_4 - \vec{v}_2)\left(\frac{Y_{curr} - Y_{neighb}}{H_{neighb}}\right) + (\vec{v}_3 - \vec{v}_2)\left(\frac{X_{curr} - X_{neighb}}{W_{neighb}}\right) \quad \text{Equation 2}$$

$$\vec{v}_1 = \vec{v}_0 + (\vec{v}_3 - \vec{v}_2)\left(\frac{W_{curr}}{W_{neighb}}\right)$$

where $Y_{curr}$, $Y_{neighb}$ are respectively the vertical position of the current CU and the selected neighboring CU in the picture, $X_{curr}$, $X_{neighb}$ are respectively the horizontal position of the current CU and the selected neighboring CU in the picture, $W_{curr}$ is the horizontal size of the current CU and $W_{neighb}$, $H_{neighb}$ are respectively the horizontal and vertical size of the selected neighboring CU.

When the control point motion vectors $\vec{v}_0$ and $\vec{v}_1$ of the current CU are obtained, the motion field inside the current CU being encoded or decoded is computed on a 4×4 sub-CU basis, through the model of Equation 1 as described above in connection with FIG. 6.

Accordingly, a general aspect of at least one embodiment aims to improve the performance of the Affine Merge mode in JEM so that the compression performance of a considered video codec may be improved. Therefore, in at least one embodiment, an augmented and improved affine motion compensation apparatus and method are presented, for example, for Coding Units that are coded in Affine Merge mode. The proposed augmented and improved affine mode includes evaluating predictor candidates which are not coded using an Affine Merge mode or an Affine Inter mode.

As discussed before, in the current JEM, the first neighboring CU coded in Affine Merge mode among the surrounding CUs is selected to predict the affine motion model associated with the current CU being encoded or decoded. That is, the first neighboring CU candidate among the ordered set (A, B, C, D, E) of FIG. 8B that is coded in affine mode is selected to predict the affine motion model of current CU. In the case where none of the neighboring CU candidate is coded in affine mode, no prediction is available for the affine motion model of the current CU.

Accordingly, in at least one embodiment, a predictor candidate is determined for coding a current CU in Affine Merge mode. Such a predictor candidate being associated to motion information corresponding to a non affine motion model. For instance, such a predictor candidate may correspond to a previously coded CU in a non affine mode, i.e a translational model as known from HEVC.

Accordingly, in at least one embodiment, the predictor candidate is selected from a set of predictor candidates. The set of predictor candidates may comprise CU previously coded using an affine mode and CU previously coded using a non affine mode. The predictor candidate from the set of predictor candidates that provides the best coding efficiency when coding the current CU in Affine Merge mode, is selected. The improvements of this embodiment, at a general level, therefore comprise, for example:

constructing a set of multiple predictor candidates that is likely to provide a good set of candidates for the prediction of an affine motion model of a CU (for encoder/decoder);

selecting one predictor for the current CU's control point motion vector among the constructed set (for encoder/decoder); and/or signaling/decoding the index of current CU's control point motion vector predictor (for encoder/decoder).

Figure 10:
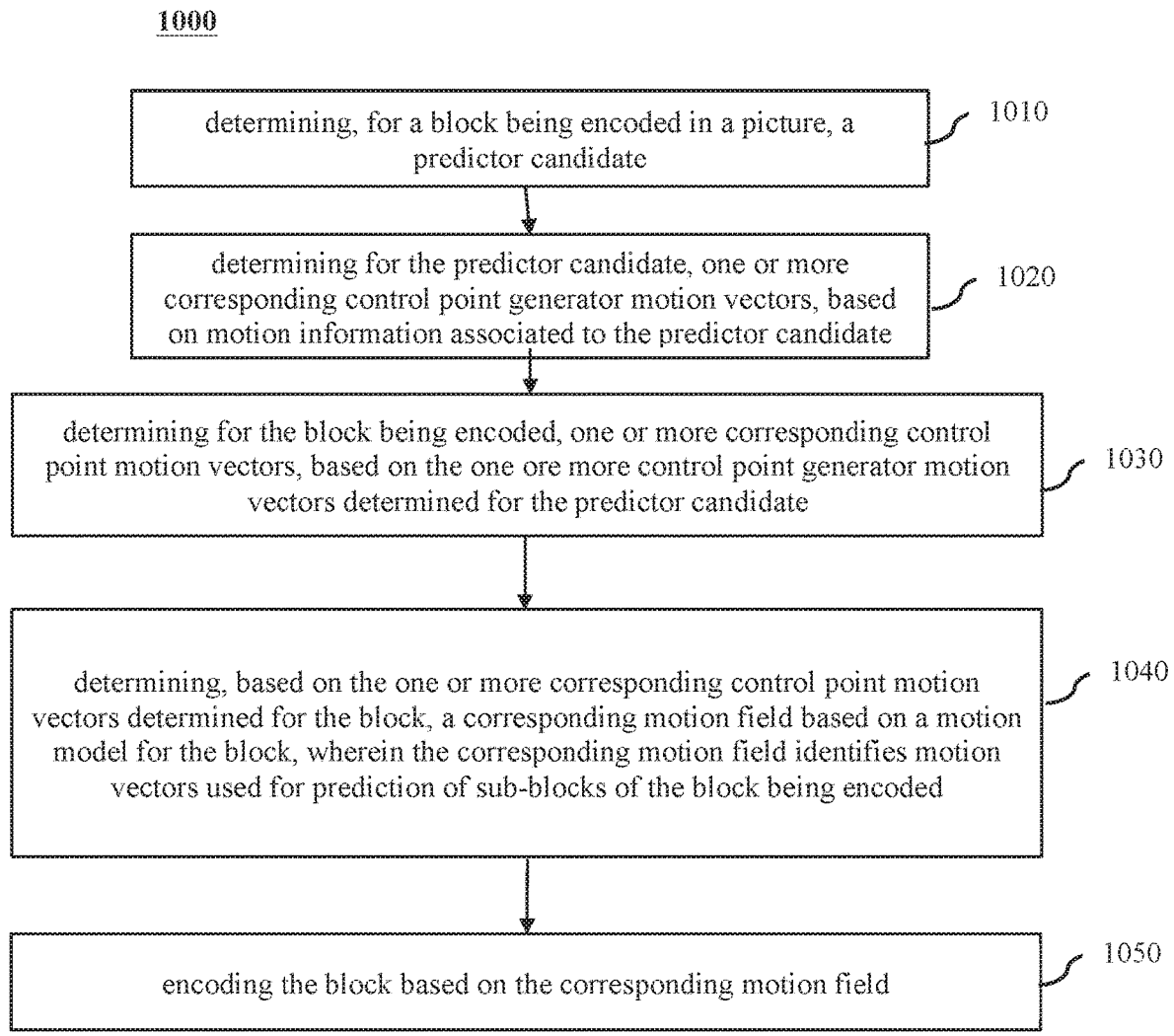
FIG. 10 illustrates an example method according to a general aspect of at least one embodiment.

Accordingly, FIG. 10 illustrates an exemplary encoding method 1000 according to a general aspect of at least one embodiment. At 1010, the method 1000 determines, for a block being encoded in a picture, a predictor candidate. The predictor candidate is associated to motion information. That is, the predictor candidate has been previously coded in an INTER mode by any method based on motion compensation prediction using the associated motion information. According to at least one embodiment, the predictor candidate verifies a predetermined criterion, for example the predictor candidate is associated to motion information that is close to an affine motion model.

At 1020, the method 1000 determines, for the predictor candidate, one or more corresponding control point generator motion vectors, based on motion information associated to the predictor candidate. Further details for such determining are given below in respect with FIG. 16. At 1030, the method 1000 determines for the block being encoded, one or more corresponding control point motion vectors, based on the one or more corresponding control point generator motion vectors determined for the predictor candidate. At 1040, the method 1000 determines, based on the one or more corresponding control point motion vectors determined for the block, a corresponding motion field, wherein the corresponding motion field identifies motion vectors used for prediction of sub-blocks of the block being encoded. At 1050, the method 1000 encodes the block based on the corresponding motion field.

Figure 11:
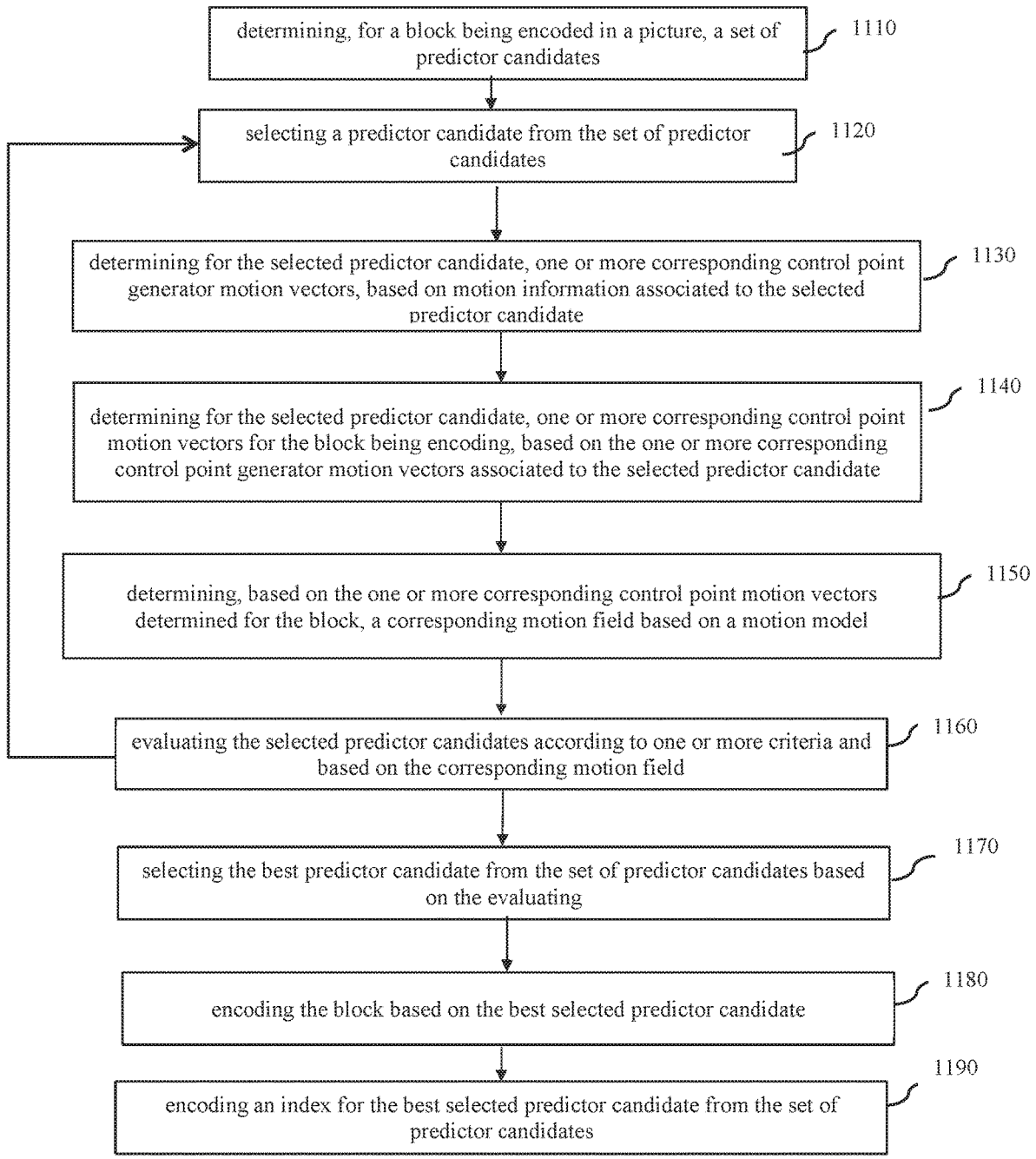
FIG. 11 illustrates another example method according to a general aspect of at least one embodiment.

FIG. 11 illustrates an exemplary encoding method 1100 according to a general aspect of at least one embodiment. At 1110, the method 1100 determines, for a block being encoded in a picture, a set of predictor candidates. According to at least one embodiment, at least one predictor candidate from the set of predictor candidates verifies a predetermined criterion, for example the at least one predictor candidate is associated to motion information that is close to an affine motion model.

At 1120, the method 1100 selects a predictor candidate among the set of predictor candidates. At 1130, the method 1100 determines, for the selected predictor candidate, one or more corresponding control point generator motion vectors, based on motion information associated to the selected predictor candidate. Further details for such determining are given below in respect with FIG. 16. At 1140, the method 1100 determines, for the block being encoded, one or more corresponding control point motion vectors, based on the one or more corresponding control point generator motion vectors determined for the selected predictor candidate. At 1150, the method 1100 determines, based on the one or more corresponding control point motion vectors determined for the block, a corresponding motion field, wherein the corresponding motion field identifies motion vectors used for prediction of sub-blocks of the block being encoded. At 1160, the method 1100 evaluates the selected predictor candidates according to one or more criteria and based on the corresponding motion field. For example, the method 1100 estimates a rate-distortion cost for encoding the block using the motion field determined at 1150 et stores the rate-distortion cost in association with the selected predictor candidate. At 1160, if all the predictor candidates of the set of predictor candidates have been evaluated, the method 1100 passes to 1170. If one or more of the predictor candidates of the set of predictor candidates have not been evaluated, the method 1100 passes to 1120 to select a new predictor candidate from the set of predictor candidates. At 1170, the method 1100 selects a predictor candidate from the set of predictor candidates based on the evaluating. For example, the predictor candidate that provides the lowest rate-distortion cost for the block being encoded is selected. At 1180, the method 1100 encodes the block based on the predictor candidate selected at 1170. At 1190, the method 1100 encodes an index the predictor candidate selected at 1170. This index is used by the decoder to retrieve the predictor candidate from the set of predictor candidates.

Figure 12:
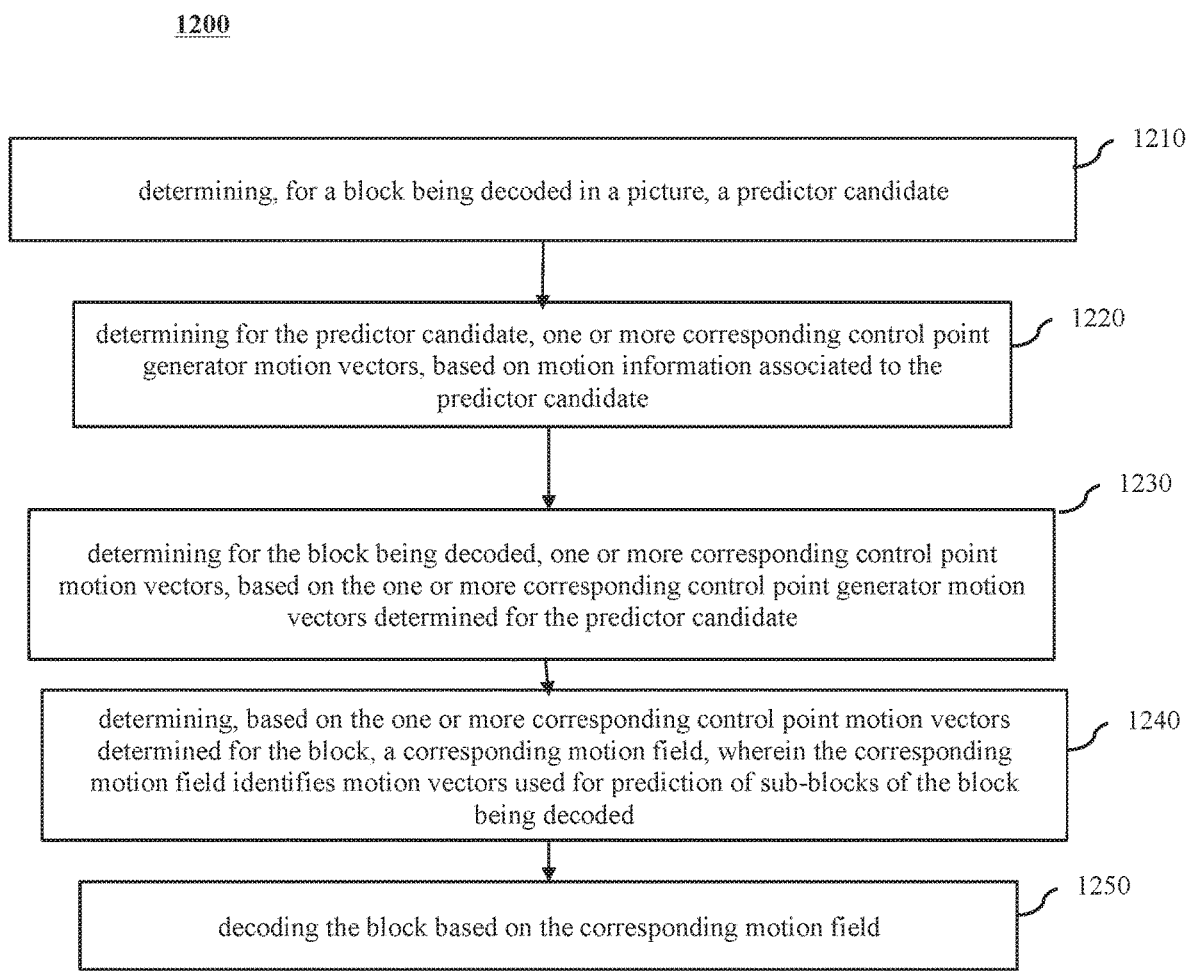
FIG. 12 also illustrates another example method according to a general aspect of at least one embodiment.

FIG. 12 illustrates an exemplary decoding method 1200 according to a general aspect of at least one embodiment. At 1210, the method 1200 determines, for a block being decoded in a picture, a predictor candidate. The predictor candidate is associated to motion information. That is, the predictor candidate has been previously decoded and reconstructed by any method based on motion compensation prediction using the associated motion information. At 1220, the method 1200 determines, for the predictor candidate, one or more corresponding control point generator motion vectors, based on motion information associated to the predictor candidate. Further details for such determining are given below in respect with FIG. 16. At 1230, the method 1200 determines for the block being decoded, one or more corresponding control point motion vectors, based on the one or more corresponding control point generator motion vectors determined for the predictor candidate. At 1240, the method 1200 determines, based on the one or more corresponding control point motion vectors determined for the block, a corresponding motion field, wherein the corresponding motion field identifies motion vectors used for prediction of sub-blocks of the block being decoded. At 1250, the method 1200 decodes the block based on the corresponding motion field.

Figure 13:
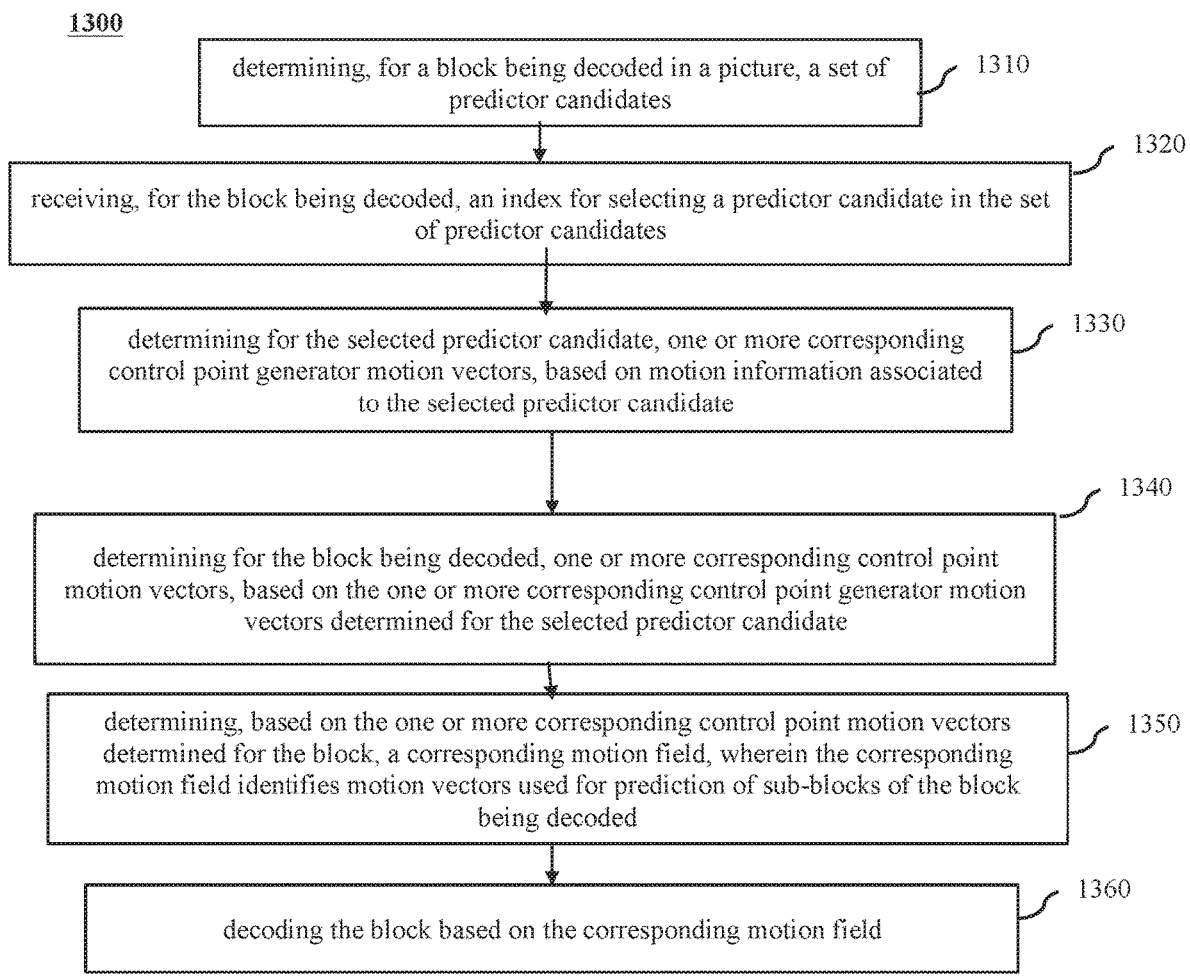
FIG. 13 also illustrates another example method according to a general aspect of at least one embodiment.

FIG. 13 illustrates an exemplary decoding method 1300 according to a general aspect of at least one embodiment. At 1310, the method 1300 determines, for a block being decoded in a picture, a set of predictor candidates. At 1320, the method 1300 receives, for a block being decoded in a picture, an index corresponding to a particular predictor candidate in the set of predictor candidates. In various embodiments, the particular predictor candidate has been selected at an encoder, and the index allows one of multiple predictor candidates to be selected. The method 1300 selects a predictor candidate in the set of predictor candidate using the received index. At 1330, the method 1300 determines, for the selected predictor candidate, one or more corresponding control point generator motion vectors, based on motion information associated to the selected predictor candidate. Further details for such determining are given below in respect with FIG. 16. At 1340, the method 1300 determines for the block being decoded, one or more corresponding control point motion vectors, based on the one or more corresponding control point generator motion vectors determined for the selected predictor candidate. At 1350, the method 1300 determines, based on the one or more corresponding control point motion vectors determined for the block, a corresponding motion field, wherein the corresponding motion field identifies motion vectors used for prediction of sub-blocks of the block being decoded. At 1360, the method 1300 decodes the block based on the corresponding motion field.

Figure 14:
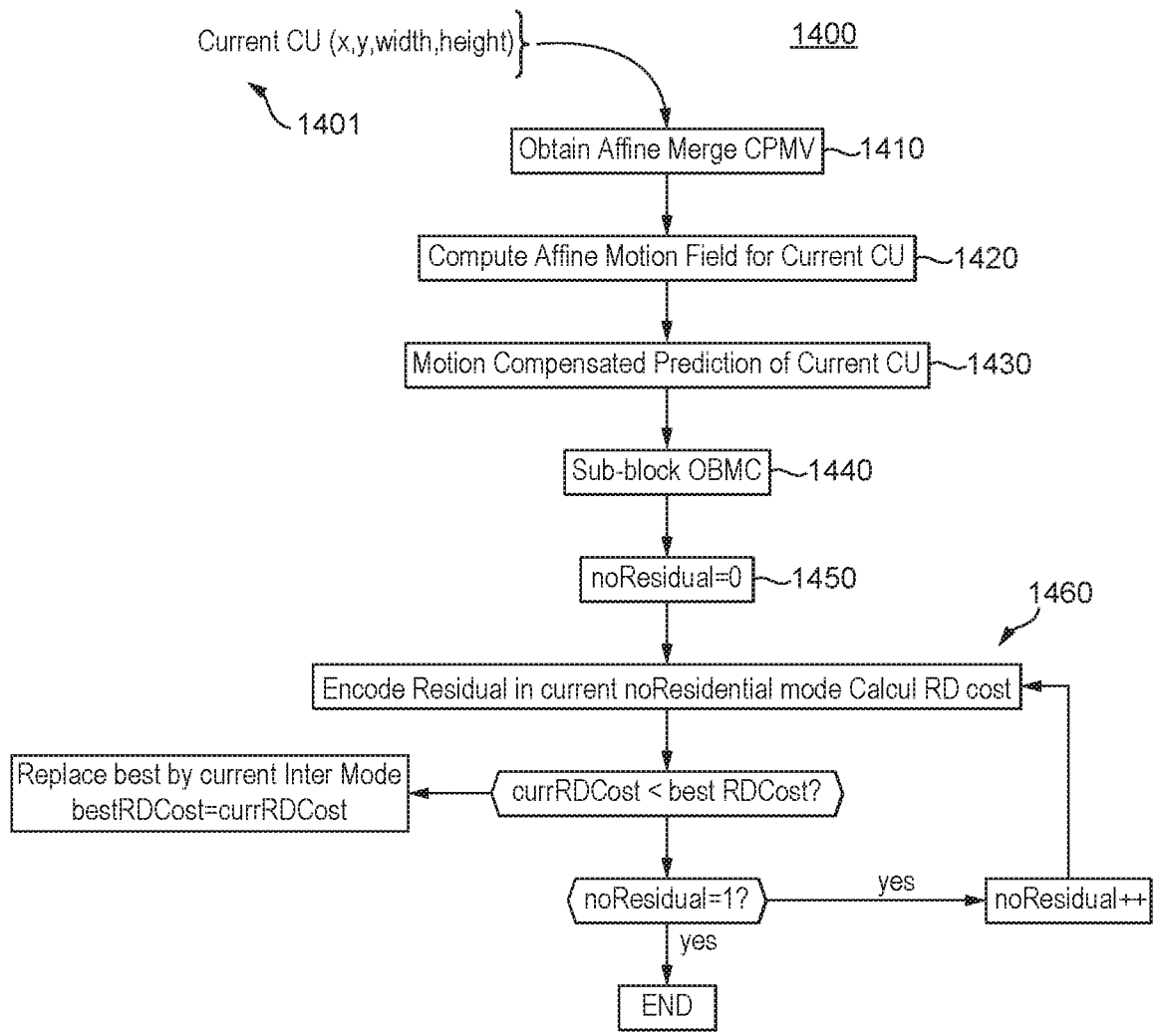
FIG. 14 illustrates an example of a process/syntax for evaluating the Affine Merge mode of an inter-CU according to a general aspect of at least one embodiment.

FIG. 14 illustrates the detail of an embodiment of a process/syntax 1400 used to predict the affine motion field of a current CU being encoded or decoded in the existing Affine Merge mode in JEM. The input 1401 to this process/syntax 1400 is the current Coding Unit for which one wants to generate the affine motion field of the sub-blocks as shown in FIG. 7. At 1410, the Affine Merge CPMVs for the current block are obtained with the selected predictor candidate as explained above in connection with, e.g., FIG. 6, FIG. 7, FIG. 8B, and FIG. 9. The derivation of this predictor candidate is also explained in more detail later with respect to FIG. 15 according to at least one embodiment.

As a result, at 1420, the top-left and top-right control point motion vectors $\vec{v}_0$ and $\vec{v}_1$ are then used to compute the affine motion field associated with the current CU. This consists in computing a motion vector for each 4×4 sub-block according to Equation 1 as explained before. At 1430 and 1440, once the motion field is obtained for the current CU, the temporal prediction of the current CU takes place, involving 4×4 sub-block based motion compensation and then OBMC (Overlapped Block Motion Compensation). At 1450 and 1460, the current CU is coded and reconstructed, successively with and without residual data. For example, at 1450, the current CU is first coded using intra mode with no residual coding. At 1460, the best way to encode the current CU (e.g., the way having minimum rate distortion cost), is then selected, which provides the coding of the current CU in the Affine Merge mode. The Affine Merge coding mode is then put in a rate distortion (RD) competition with other coding modes (including e.g., inter mode with residual coding) available for the current CU in the considered video coding system. A mode is selected based on the RD competition, and that mode is used to encode the current CU, and an index for that mode is also encoded in various embodiments.

In at least one implementation, a residual flag is used. At 1450, a flag is activated indicating that the coding is done with residual data. At 1460, the current CU is fully coded and reconstructed (with residual) giving the corresponding RD cost. Then the flag is deactivated indicating that the coding is done without residual data, and the process goes back to 1460 where the CU is coded (without residual) giving the corresponding RD cost. The lowest RD cost between the two previous ones indicates if residual must be coded or not (normal or skip). Then this best RD cost is put in competition with other coding modes. Rate distortion determination will be explained in more detail below.

Figure 15:
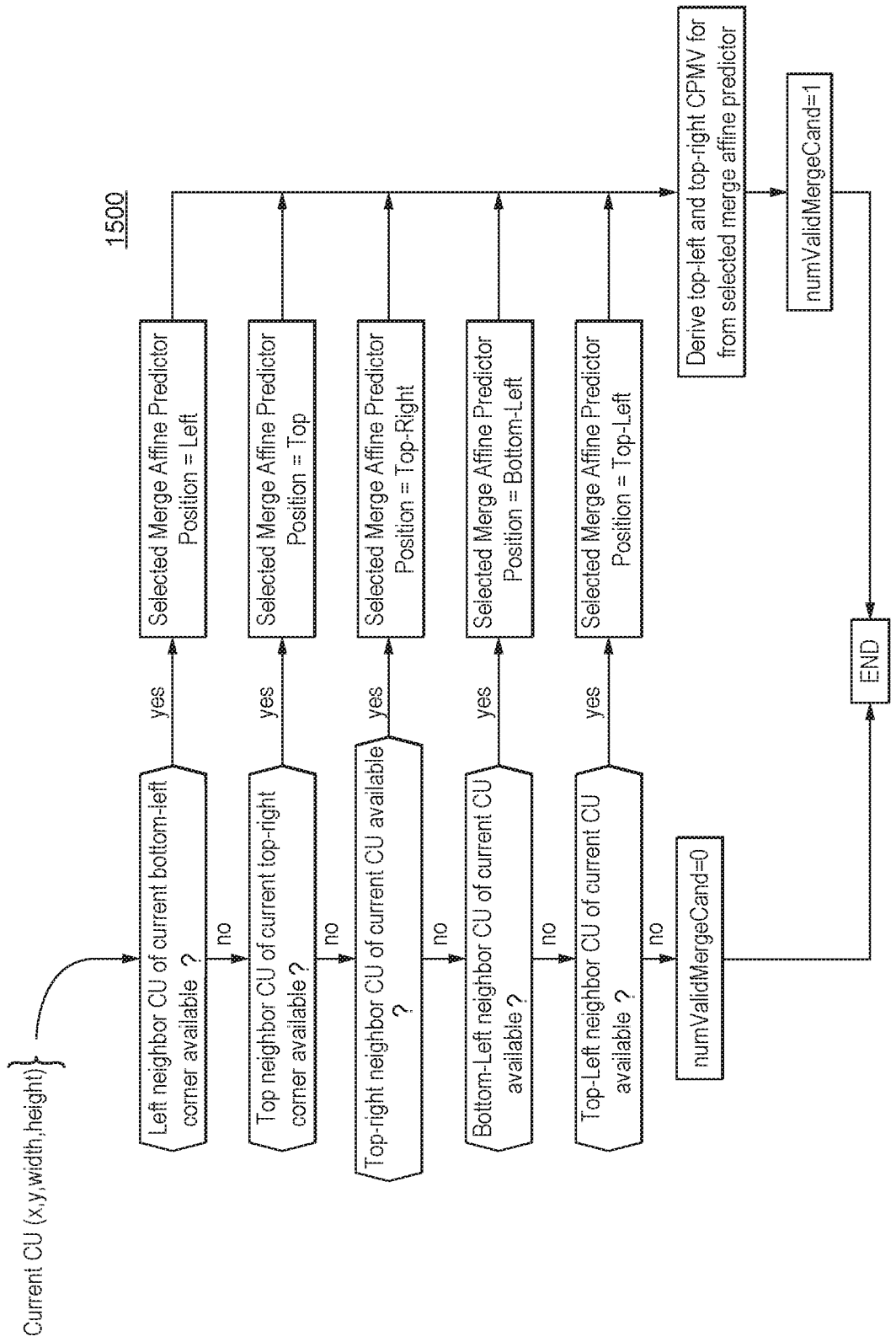
FIG. 15 illustrates an example of a process/syntax for determining a predictor candidate in an Affine Merge mode according to a general aspect of at least one embodiment.

FIG. 15 shows the detail of an embodiment of a process/syntax 1500 used to predict the one or more control points of the current CU's affine motion field. This consists in searching a CU among the spatial positions (A, B, C, D, E) of FIG. 8B that is suitable for deriving for the current CU one or more control points of an affine motion model. Such a suitable CU may verify a predetermined criterion, for example such a CU has been previously encoded using motion information that is close to an affine motion model. Examples of such coding modes are given later with respect to FIG. 20A-B, 21-23.

The spatial positions (A, B, C, D, E) of FIG. 8B are evaluated in sequential order, and the first position that corresponds to a CU verifying the predetermined criterion is selected. The process/syntax 1500 then consists in computing control point motion vectors for the current CU that will be used later to generate the affine motion field assigned to the current CU to encode. This control point computation proceeds as follows. The CU that contains the selected position is determined. It is one of the neighbor CUs of current CU as explained before. Next, the 3 CPMVs $\vec{v}_2$, $\vec{v}_3$, and $\vec{v}_4$ from the top-left, top-right and bottom-left corners inside the selected neighbor CU are retrieved or determined. For simplicity, here, the 3 CPMVs $\vec{v}_2$, $\vec{v}_3$, and $\vec{v}_4$ are called control point generator motion vectors. If the control point generator motion vectors have not yet been determined, and if the neighbor CU is not in an affine mode, the control point generator motion vectors for the neighbor CU are determined as explained in connection with FIG. 16. If the control point generator motion vectors have already been determined for the selected neighbor CU, the 3 CPMVs $\vec{v}_2$, $\vec{v}_3$, and $\vec{v}_4$ are retrieved. If the selected neighbor CU is in an affine mode, the control point generator motion vectors (CPMVs $\vec{v}_2$, $\vec{v}_3$, and $\vec{v}_4$) are determined from the top-left and top-right CPMVs $\vec{v}_0$, and $\vec{v}_1$ of the selected neighbor CU using Equation 1. Finally, the top-left and top-right CPMVs $\vec{v}_0$, and $\vec{v}_1$ of the current CU are derived from the 3 CPMVs $\vec{v}_2$, $\vec{v}_3$, and $\vec{v}_4$, according to Equation 2, as explained before in connection with FIG. 9.

Figure 16:
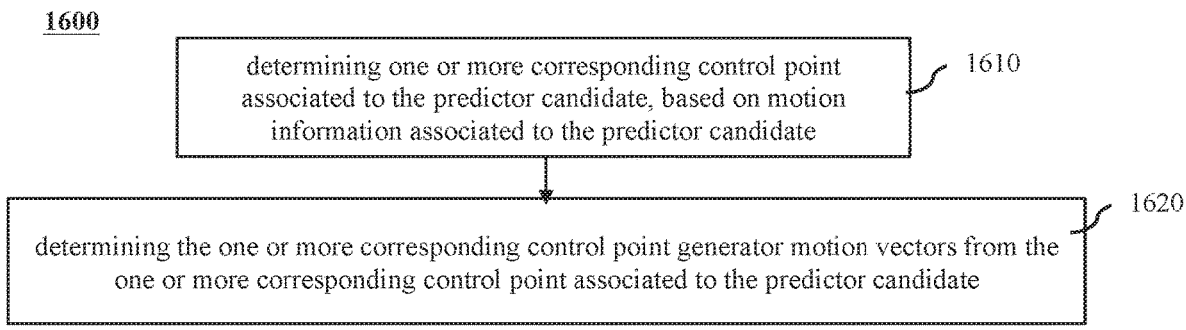
FIG. 16 illustrates an example of a process/syntax for determining one or more corresponding control point generator motion vectors for a predictor candidate having a non-affine motion model.

According to at least one embodiment, FIG. 16 shows a method 1600 for determining for a predictor candidate, one or more corresponding control point generator motion vectors, based on motion information associated to the predictor candidate. At 1610, the method 1600 determines one or more corresponding control point associated to the predictor candidate, based on motion information associated to the predictor candidate. Further details are given below with respect to FIG. 17. At 1620, the method 1600 determines the one or more corresponding control point generator motion vectors from the one or more corresponding control point associated to the predictor candidate.

According to an embodiment, the one or more corresponding control point generator motion vectors of the predictor candidate comprise a motion vector of a top left corner of the predictor candidate, a motion vector $\vec{v}_3$ of an above right corner of the predictor candidate, and a motion vector $\vec{v}_4$ of a left bottom corner of the predictor candidate. The CPMV $\vec{v}_0$ and $\vec{v}_1$ of the current CU to encode are determined using Equation 2.

Figure 17A:
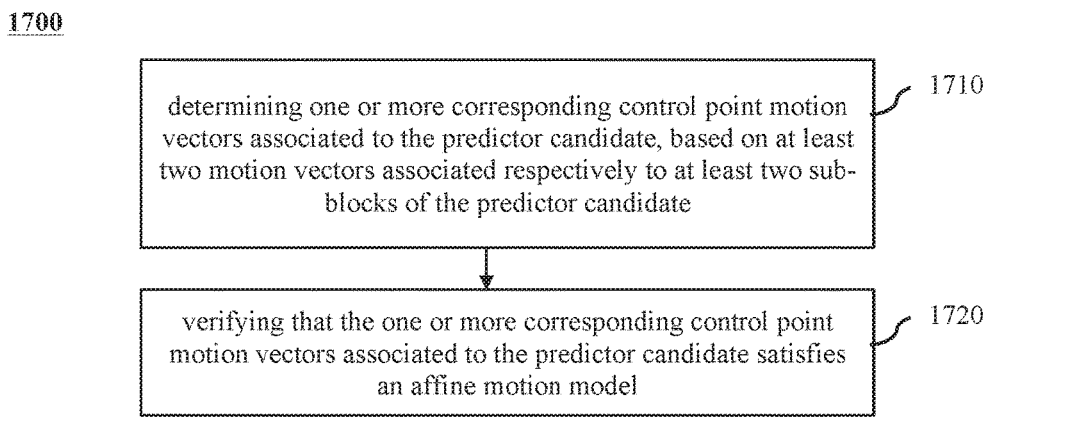
FIG. 17A illustrates an example of a process/syntax for determining one or more corresponding control point motion vectors for a predictor candidate having a non-affine motion model.

According to at least one embodiment, FIG. 17A shows a method 1700 for determining one or more corresponding control point associated to a predictor candidate, based on motion information associated to the predictor candidate. According to an embodiment, the predictor candidate comprises one or more sub-blocks, each sub-block being associated to at least one motion vector. At 1710, the method 1700 determines one or more corresponding control point motion vectors associated to the predictor candidate, based on the at least two motion vectors associated respectively to at least two sub-blocks of the predictor candidate. For example, if we denote $\vec{v}_{s0}$ a motion vector of a first sub-block of the predictor candidate, $\vec{v}_{sw}$ a motion vector of the last sub-block of the first line of the predictor candidate, $\vec{v}_{sh}$ a motion vector of the last sub-block of the first column of the predictor candidate, and $\vec{v}_{swh}$ a motion vector of the sub-block of the last line and last column of the predictor candidate, the one or more corresponding control point motion vectors for the predictor candidate may be set to $\vec{v}_{s0}$ for the top-left corner point motion vector of the predictor candidate ($\vec{v}_0$) and to $\vec{v}_{sw}$ for the top-right corner point motion vector of the predictor candidate ($\vec{v}_1$). At 1720, the method 1700 verifies that the one or more corresponding control point motion vectors associated to the predictor candidate satisfies an affine motion model. For example, the method 1700 estimates the motion vectors $\vec{v}_{sh}'$ and $\vec{v}_{swh}'$ using Equation 1 and $\vec{v}_{s0}$ and $\vec{v}_{sh}$ as CMPVs of the predictor candidate. At 1720, the method 1700 then compare the estimated motion vectors $\vec{v}_{sh}'$ and $\vec{v}_{swh}'$ with the motion vectors $\vec{v}_{sh}$ and $\vec{v}_{swh}$ associated to the corresponding sub-blocks. If the respective motion vectors are close in angles and norm values, the one or more corresponding control point motion vectors determined at 1710 is close to an affine motion mode, and the predictor candidate associated to the one or more corresponding control point motion vectors determined at 1710 can be used as a predictor candidate for a block coded in an affine mode.

The respective motion vectors are close if the absolute difference between their norm is below a threshold and the angle between the two motion vectors is below another threshold, wherein the thresholds may be fixed values, for example one pixel for the norm, or 45° for the angle, or a value set according to the motion vector precision, for example 4 times the precision of the vector, or a value set according to the size of the motion vector.

Figure 17B:
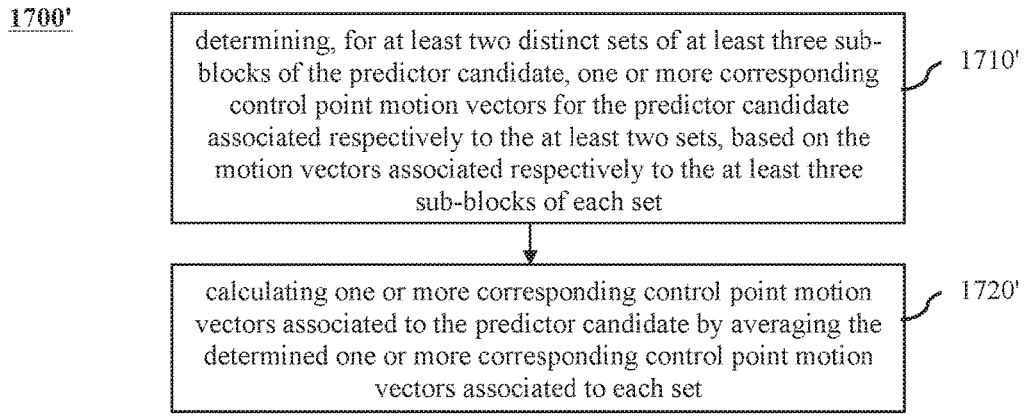
FIG. 17B illustrates another example of a process/syntax for determining one or more corresponding control point motion vectors for a predictor candidate having a non-affine motion model.

According to at least one embodiment, FIG. 17B shows a method 1700' for determining one or more corresponding control point associated to a predictor candidate, based on motion information associated to the predictor candidate. According to an embodiment, the predictor candidate comprises one or more sub-blocks, each sub-block being associated to at least one motion vector. At 1710', the method 1700' determines, for at least two distinct sets of at least three sub-blocks of the predictor candidate, one or more corresponding control point motion vectors for the predictor candidate associated respectively to the at least two sets, based on the motion vectors associated respectively to the at least three sub-blocks of each set. For example, as illustrated on FIG. 22, a CU (Cur block) comprises four sub-blocks $s_0$, $s_w$, $s_h$ and $s_{wh}$, sub-block being respectively associated to a motion vector $\vec{v}_{s0}$, $\vec{v}_{sw}$, $\vec{v}_{sh}$ and $\vec{v}_{swh}$. Multiple distinct sets of sub-blocks may be defined as $(s_0, s_w, s_h)$, $(s_0, s_w, s_{wh})$, $(s_0, s_h, s_{wh})$, and $(s_w, s_h, s_{wh})$ For each set of sub-blocks, one or more corresponding control point motion vectors are estimated for the predictor candidate using Equation 1. That is, at 1710', the parameters $v_{0x}$, $v_{0y}$, $v_{1x}$ and $v_{1y}$ of Equation 1 are determined for each set using the motion vectors associated respectively the sub-blocks of the set. Multiple sets of parameters $\{p_{0x}, v_{0y}, v_{1x}, v_{1y}\}$ are thus obtained. At 1720', the method 1700' calculates one or more corresponding control point motion vectors associated to the predictor candidate by averaging the one or more corresponding control point motion vectors associated to each set determined at 1710'. That is the parameters $v_{0x}$, $v_{0y}$, $v_{1x}$ and $v_{1y}$ for the predictor candidate are obtained by averaging the parameters $v_{0x}$, $v_{0y}$, $v_{1x}$ and $v_{1y}$ obtained from each set of sub-blocks. According to another variant, the parameters $v_{0x}$, $v_{0y}$, $v_{1x}$ and $v_{1y}$ for the predictor candidate may be obtained as the median of the parameters $v_{0x}$, $v_{0y}$, $v_{1x}$ and $v_{1y}$ from each set of sub-blocks.

One general aspect of at least one embodiment consists in selecting a better motion predictor candidate to derive the CPMVs of a current CU being encoded or decoded, among a set of multiple predictor candidates. On the encoder side, the candidate used to predict the current CPMVs is chosen according to a rate distortion cost criteria, according to one aspect of one exemplary embodiment. Its index is then coded in the output bit-stream for the decoder, according to another aspect of another exemplary embodiment. The decoder, then, receives and decodes the index corresponding to the selected candidate from the bit-stream to derive the corresponding relevant data.

According to another aspect of another exemplary embodiment, CPMVs used herewith are not limited to the two at the top-right and top-left positions of the current CU being coded or decoded, as shown in FIG. 6. Other embodiments comprise, e.g., only one vector or more than two vectors, and the positions of these CPMVs are e.g., at other corner positions, or at any positions in or out of the current block, as long as it is possible to derive a motion field such as, e.g., at the position(s) of the center of the corner 4×4 sub-blocks, or the internal corner of the corner 4×4 sub-blocks.

Figure 18:
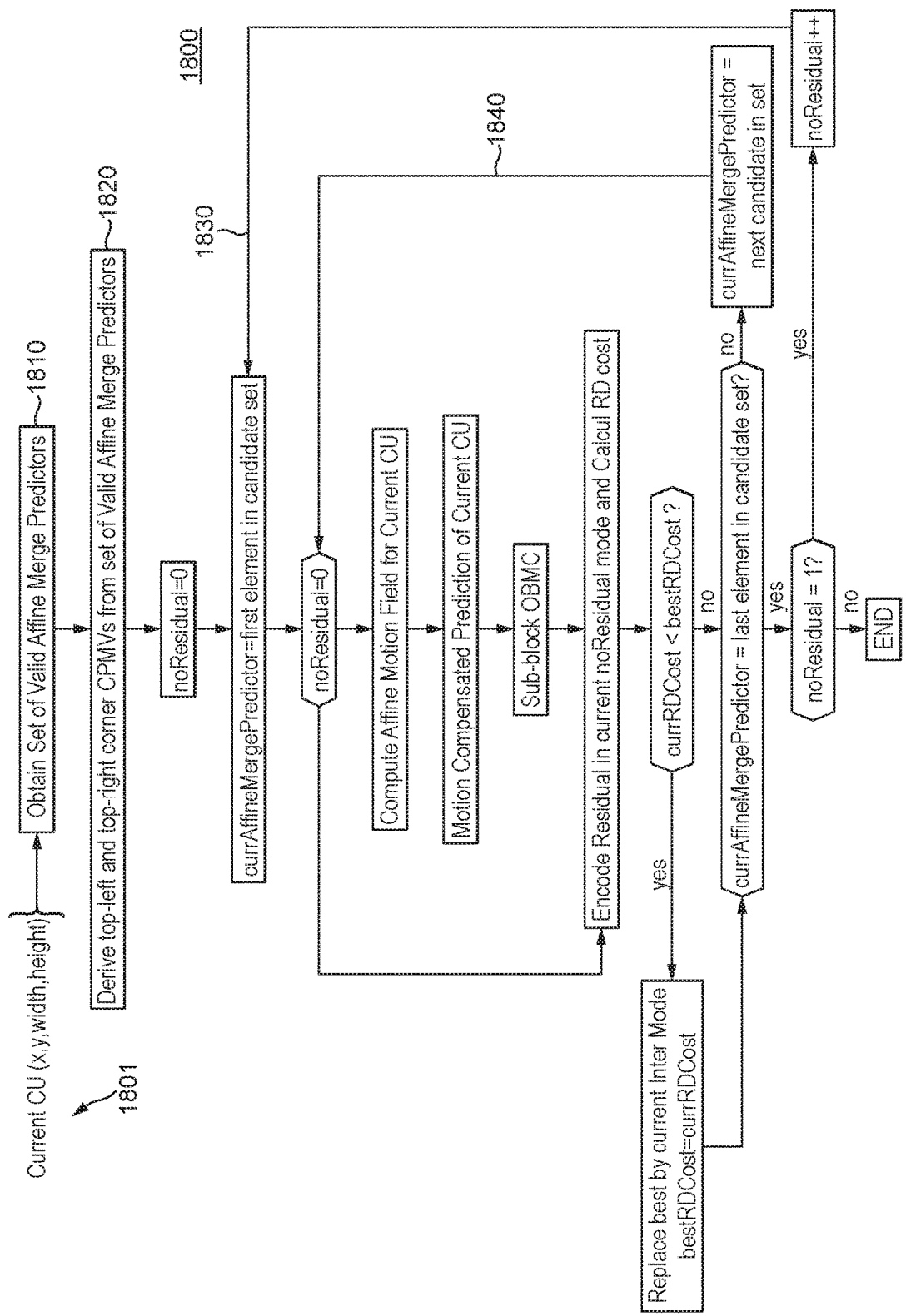
FIG. 18 illustrates an example of a predictor candidate selection process/syntax according to a general aspect of at least one embodiment.

In an exemplary embodiment, the set of potential candidate predictors being investigated is identical to the set of positions (A, B, C, D, E) used to retrieve the CPMV predictor in the existing Affine Merge mode in JEM, as illustrated in FIG. 8B. FIG. 18 illustrates the details of one exemplary selection process/syntax 1800 for selecting the best candidate to predict a current CU's affine motion model according to a general aspect of this embodiment. However, other embodiments use a set of predictor positions that is different from A, B, C, D, E, and that can include fewer or more elements in the set.

As shown at 1801, the input to this exemplary embodiment 1800 is also information of the current CU being encoded or decoded. At 1810, a set of multiple predictor candidates is built, according to the algorithm 1900 of FIG. 19, which is explained below. Algorithm 1900 of FIG. 19 includes gathering all neighboring positions (A, B, C, D, E) shown in FIG. 8A that corresponds to a past CU which satisfied the predetermined criterion explained with FIG. 15, into a set of candidates for the prediction of current CU affine motion. Thus, instead of stopping when a past CU satisfying the predetermined criterion is found as in FIG. 15, the process/syntax 1800 stores all possible candidates for the current CU.

Figure 19:
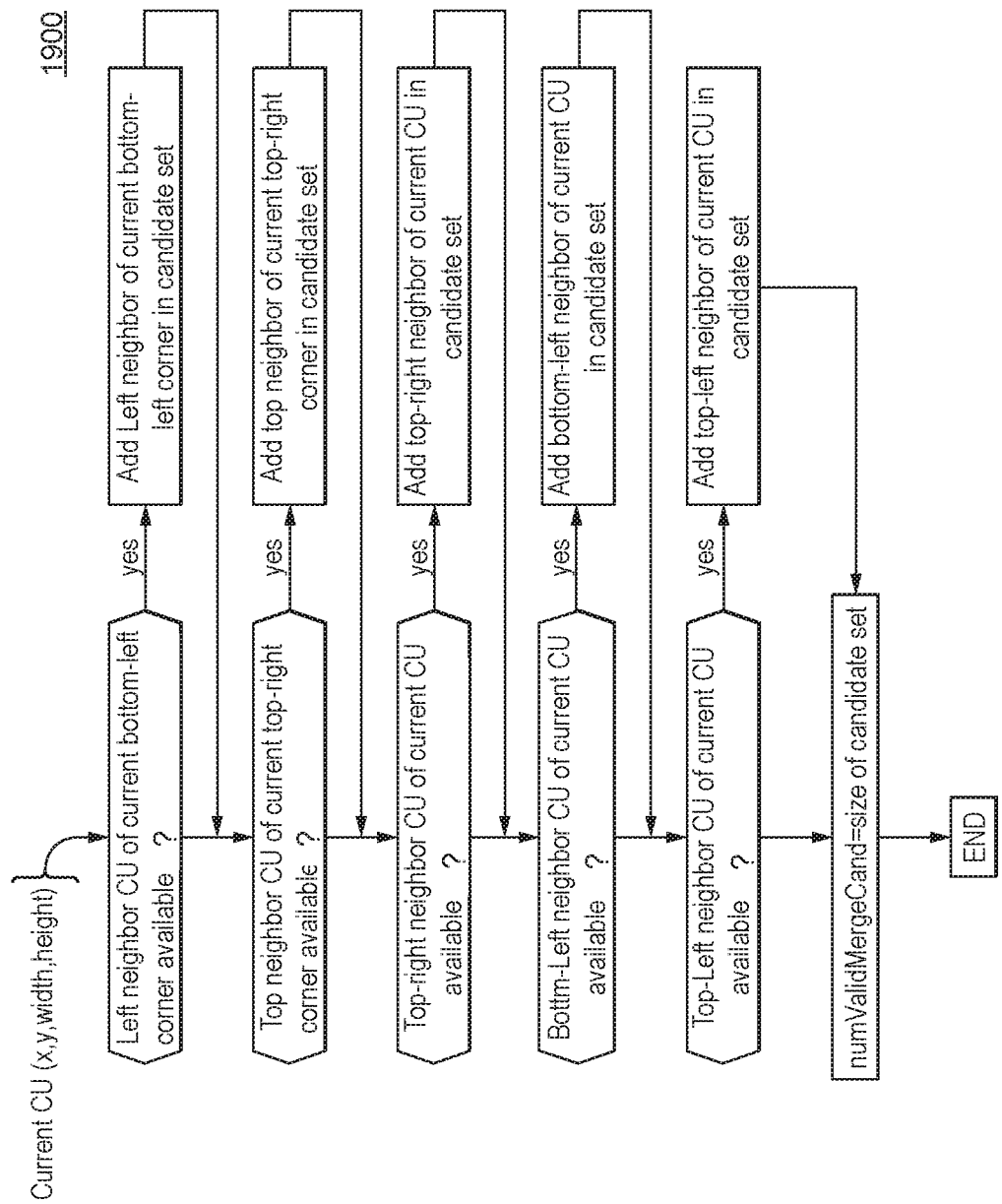
FIG. 19 illustrates an example of a process/syntax to build a set of multiple predictor candidates according to a general aspect of at least one embodiment.

Once the process of FIG. 19 is done as shown at 1810 of FIG. 18, the process/syntax 1800 of FIG. 18, at 1820, computes the top-left and top-right corner CPMVs predicted from each candidate of the set provided at 1810. This process of 1820 is further detailed and illustrated by FIG. 20.

Figure 20:
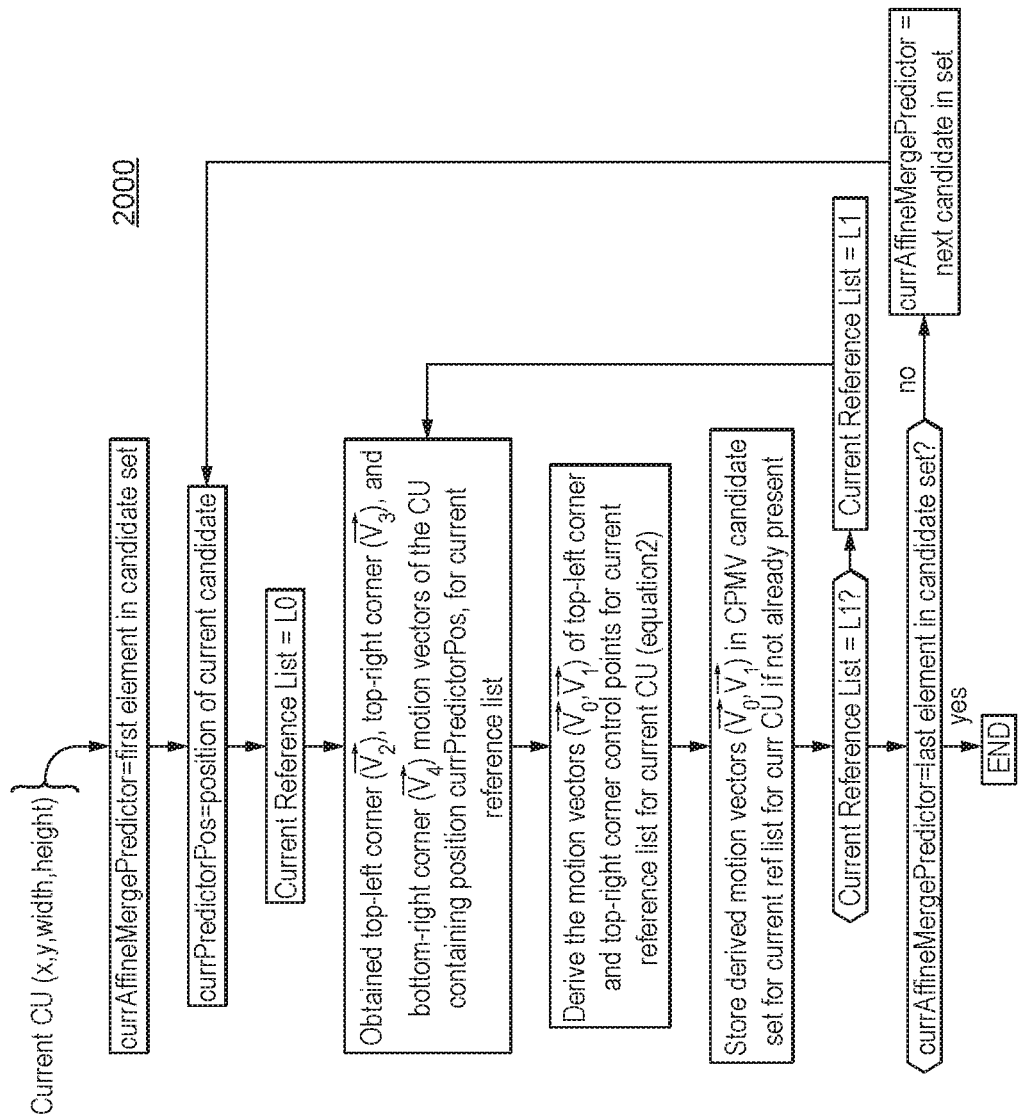
FIG. 20 illustrates an example of a derivation process/syntax of top-left and top-right corner CPMVs for each predictor candidate according to a general aspect of at least one embodiment.

Again, FIG. 20 shows the detail of 1820 in FIG. 18 and includes a loop over each candidate determined and found from the preceding step (1810 of FIG. 18). For each predictor candidate in the set of predictor candidates, the CU that contains the spatial position of that candidate is determined. Then for each reference list L0 and L1 (in the case of a B slice), the control point motion vectors $\vec{v}_0$ and $\vec{v}_1$ useful to produce the current CU's motion field are derived according to Equation 2, using the CPMVs $\vec{v}_2$, $\vec{v}_3$ and $\vec{v}_4$ of the determined CU. If the determined CU is not in an affine mode, the CPMVs $\vec{v}_2$, $\vec{v}_3$ and $\vec{v}_4$ of the determined CU are determined as explained with respect to FIG. 16. The two CPMVs for each candidate are then stored in the set of candidate CPMVs.

Once the process of FIG. 20 is done and the process is returned to FIG. 18, a loop 1830 over each Affine Merge predictor candidate is performed. It may select, for example, the CPMV candidate that leads to the lowest rate distortion cost. Inside the loop 1830 over each candidate, another loop 1840 which is similar to the process as shown on FIG. 14 is used to code the current CU with each CPMV candidate as explained before. The algorithm of FIG. 14 ends when all candidates have been evaluated, and its output may comprise the index of the best predictor. As indicated before, as an example, the candidate with the minimum rate distortion cost may be selected as the best predictor. Various embodiments use the best predictor to encode the current CU, and certain embodiments also encode an index for the best predictor.

One example of a determination of the rate distortion cost is defined as follows, as is well known to a person skilled in the art:

$$RD_{cost} = D + \lambda \times R$$

wherein D represents the distortion (typically a L2 distance) between the original block and a reconstructed block obtained by encoding and decoding the current CU with the considered candidate; R represents the rate cost, e.g. the number of bits generated by coding the current block with the considered candidate; λ is the Lagrange parameter, which represents the rate target at which the video sequence is being encoded.

One advantage of the exemplary candidate set extension methods described in this application is an increase in the variety in the set of candidate Control Point Motion Vectors that may be used to construct the affine motion field associated with a given CU. Thus, the present embodiments provide technological advancement in the computing technology of video content encoding and decoding. For example, the present embodiments improve the rate distortion performance provided by the Affine Merge coding mode in JEM. This way, the overall rate distortion performance of the considered video codec has been improved.

Also, according to another general aspect of at least one embodiment, the Affine Inter mode as described before may also be improved with all of the current teachings presented herewith by having an extended list of predictor candidates. As described above in connection with FIG. 8A, one or more CPMVPs of an Affine Inter CU are derived from neighboring motion vectors regardless of their coding mode. As disclosed in FIG. 17, it is possible to derive CPMV's of a neighboring CU satisfying the predetermined criterion. That is, according to the method explained with respect to FIG. 17, for a neighboring CU that is associated to motion information close to an affine motion model, it is possible to derive estimated CPMVs for that neighboring CU. Therefore, it is then possible to take advantage of the neighbors which have a motion close to an affine motion model to construct the one or more CPMVPs of the current Affine Inter CU, as in Affine Merge mode as described before. In that case, the considered candidates may be the same list as described above for Affine Merge mode (e.g., not limited to only spatial candidates).

Accordingly, a set of predictor candidates are provided to improve compression/decompression being provided by the current HEVC and JEM by using more predictor candidates. The process will be more efficient and coding gain will be observed even if it may be needed to transmit a supplemental index.

According to embodiments explained with respect to FIG. 10-13, at least one predictor candidate that is selected satisfies a predetermined criterion. Such a predictor candidate is associated to motion information that is close to an affine motion model, even though the predictor candidate is not in an affine mode.

FIG. 21-24 illustrates coding modes that may provide predictor candidates satisfying the predetermined criterion.

According to an embodiment, a predictor candidate satisfies the predetermined criterion if the predictor candidate is associated to motion information derived from:
 a bilateral template matching between two reference blocks in respectively two reference frames, or
 a reference block of a reference frame identified by motion information of a first spatial neighboring block of the predictor candidate, or
 an average of motion vectors of spatial and temporal neighboring blocks of the predictor candidate.

Figure 21:
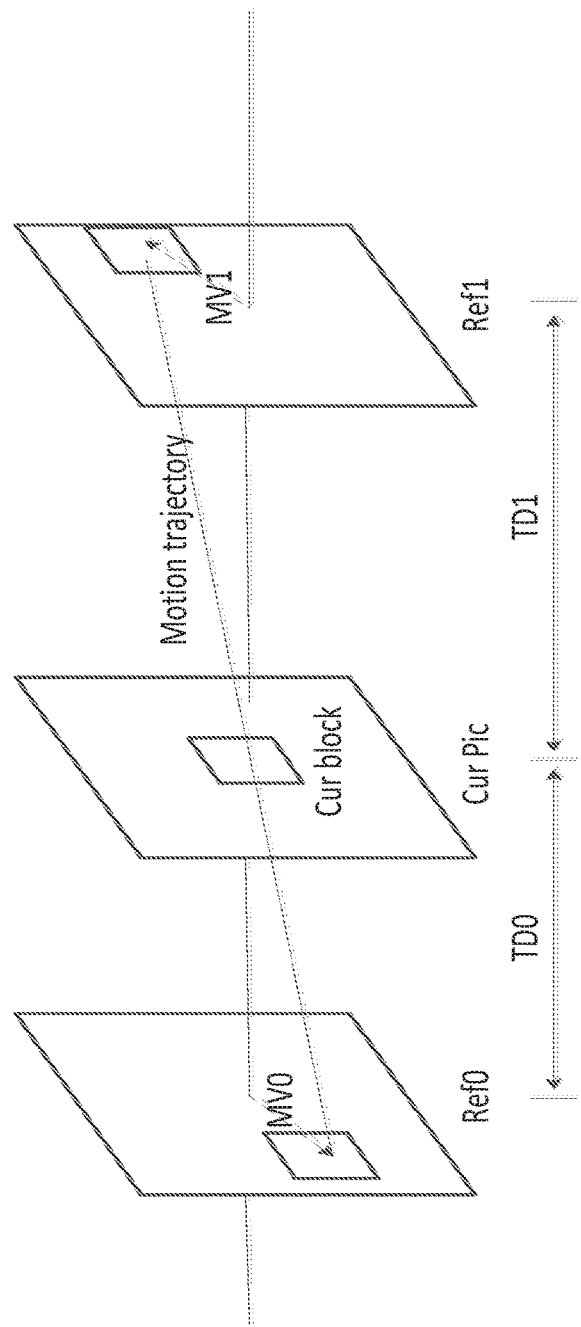
FIG. 21 illustrates an example of a CU coded using a bilateral template matching between two reference blocks in respectively two reference frames.
Figure 22:
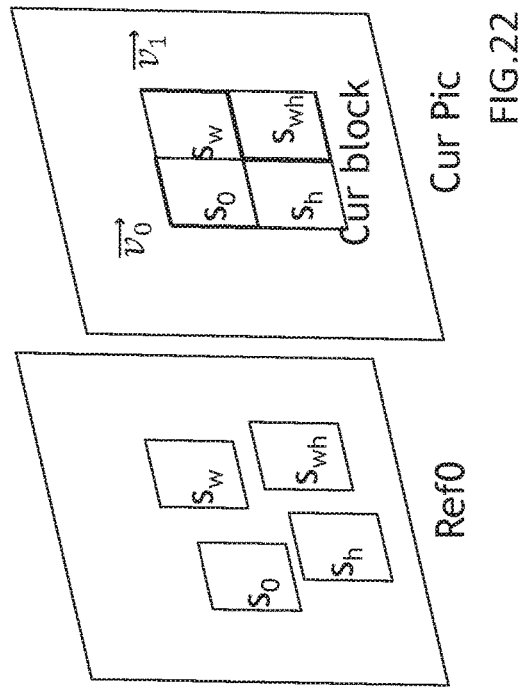
FIG. 22 illustrates an example of a CU coded using a bilateral template matching divided into sub-blocks.

FIG. 21 illustrates a current CU (Cur block) of a picture (Cur Pic) predicted using a bilateral template matching between two reference blocks in respectively two reference frames (Ref0, Ref1). The motion vector of the current CU is refined according to the bilateral template matching cost minimization. As illustrated in FIG. 22, this current CU is then divided into smaller sub-blocks ($s_0$, $s_w$, $s_h$, $s_{wh}$) and the motion vector for each sub-block is further refined with the bilateral template matching cost independently at the sub-block level.

Either at the CU or at the sub-block level, the templates are defined as the reference blocks in reference frames as shown on FIG. 21. The first template is obtained through a candidate motion vector referring to a reference frame from a particular reference frame list (for example, with MV0 on reference frame 0 of reference frame list 0). The second template is obtained in a reference frame from the other reference frame list (on reference frame 0 of reference frame list 1) with a scaled version of the candidate motion vector (MV1) so that the motion trajectory goes through the current CU in the current frame. The associated bilateral template matching cost is then the SAD between these two reference blocks (templates).

According to the bilateral template matching, since a CU coded using the bilateral mode has a slightly different motion vector for each of its sub-blocks, the motion vectors of the sub-blocks can be interpreted as a motion field. In some cases, this motion field could be close to an affine motion field. It is then possible to estimate a nearest affine motion field for that CU, i.e. the closest affine model with its CPMV, so that the estimated CPMVs could be used as predictor candidate to predict an affine coding mode. Estimating a nearest affine motion field for the CU coded in the bilateral template matching may be performed as explained with respect to FIG. 17.

Figure 23:
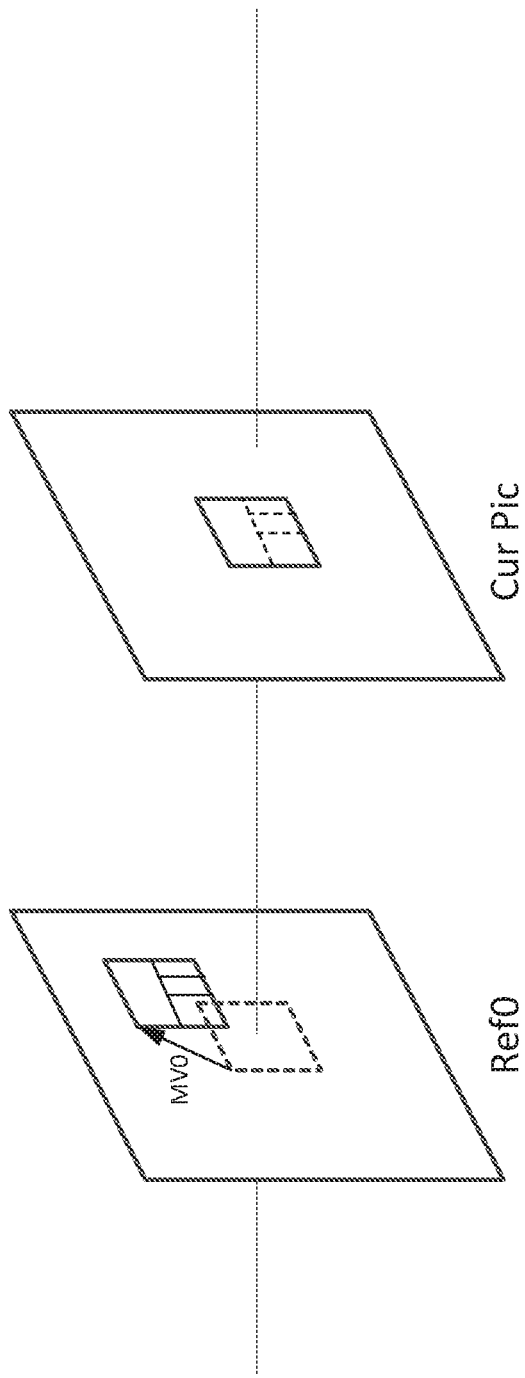
FIG. 23 illustrates an example of a CU coded in an ATMVP mode of the JEM.
Figure 24:
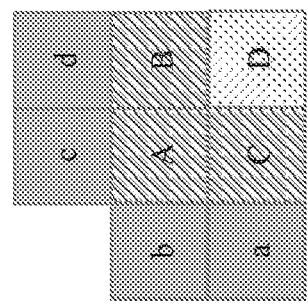
FIG. 24 illustrates an example of a CU coded in an STMVP mode of the JEM.

FIG. 23 illustrates a current CU of a picture (Cur Pic) predicted using a reference block of a reference frame (Ref0) identified by motion information of a first spatial neighboring block of the predictor candidate. Such a coding mode is also known as the ATMVP (for Alternative Temporal Motion Vector Prediction) in the JEM. The ATMVP candidate aims at reproducing the partitioning observed in the reference frame Ref0 at a position given by the first spatial candidate from the merge predictor list. The first Merge (spatial) candidate gives a motion vector and a current reference frame (for example, MV0 and Ref0 on FIG. 23). The partitions observed in the corresponding compensated block are copied to the current one and the associated motion vectors are scaled according to the current reference frame. The copied partitions can come from one or several CUs that can be coded with any modes. Thus, when the partitions come from an Affine mode, a Template and/or a FRUC Bilateral CUs, it is possible to estimate and store the corresponding Affine model (CPMV) and then to use the estimated Affine model as a predictor for an Affine coding mode. Estimating the Affine model for the CU coded in ATMVP may be performed as explained with respect to FIG. 17. For a CU coded in ATMVP, the partitions of the CU may be divided into 4×4 sub-blocks and each 4×4 sub-blocks is associated to motion information of the partition to which it belongs. The process disclosed in FIG. 17 is then performed on each of the 4×4 sub-blocks of the CU to obtain an affine model for the CU.

In JEM, a CU may be coded in an STMVP mode wherein motion information for that CU is derived as an average of motion vectors of spatial and temporal neighboring blocks of the CU. The STMVP candidate performs an average of spatial and temporal neighboring motion vectors at a 4×4 sub-block level as shown on FIG. 24. The motion vector of each sub-block is defined as the average of the top and left spatial neighboring motion vectors and of the bottom-right temporal motion vector. For example, motion vector of the A sub-block is the average of the spatial b and c motion vectors and of the D temporal motion vector. If the surrounding and the temporal neighbors come from Affine, Template and/or FRUC Bilateral CUs, the STMVP motion vectors will be closed to an affine motion field. Then, it could be possible to estimate and store a corresponding Affine model (CPMV) for the CU coded in STMVP as explained in FIG. 17 and to use it as a predictor for an Affine coding mode.

Figure 25:
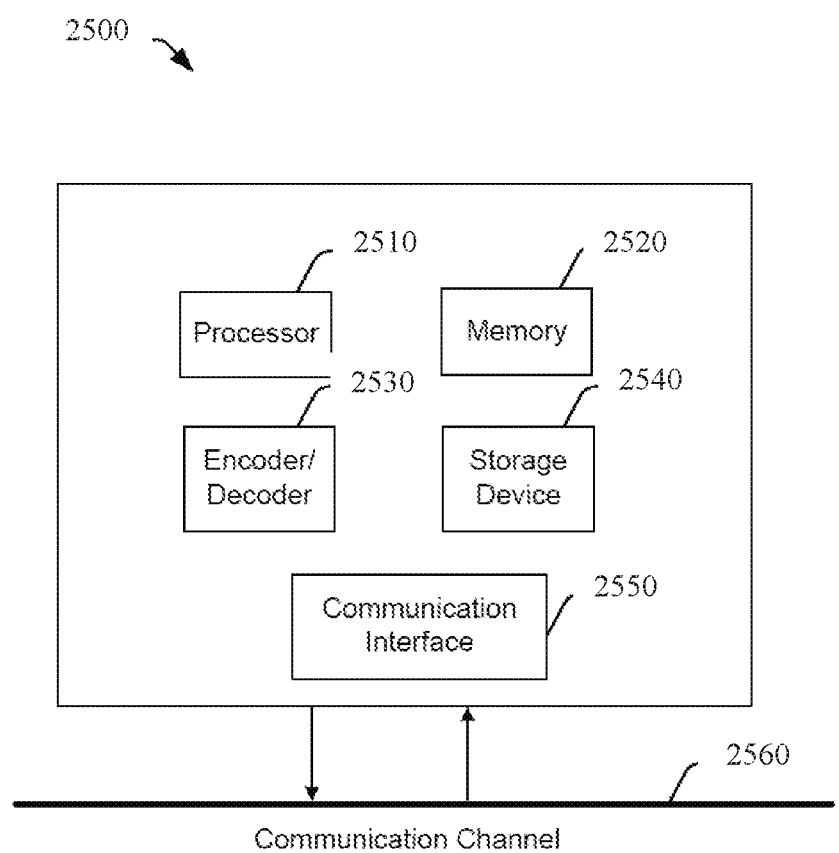
FIG. 25 illustrates a block diagram of an example apparatus in which various aspects of the embodiments may be implemented.

FIG. 25 illustrates a block diagram of an exemplary system 2500 in which various aspects of the exemplary embodiments may be implemented. The system 2500 may be embodied as a device including the various components described below and is configured to perform the processes described above. Examples of such devices, include, but are not limited to, personal computers, laptop computers, smartphones, tablet computers, digital multimedia set top boxes, digital television receivers, personal video recording systems, connected home appliances, and servers. The system 2500 may be communicatively coupled to other similar systems, and to a display via a communication channel as shown in FIG. 25 and as known by those skilled in the art to implement all or part of the exemplary video systems described above.

Various embodiments of the system 2500 include at least one processor 2510 configured to execute instructions loaded therein for implementing the various processes as discussed above. The processor 2510 may include embedded memory, input output interface, and various other circuitries as known in the art. The system 2500 may also include at least one memory 2520 (e.g., a volatile memory device, a non-volatile memory device). The system 2500 may additionally include a storage device 2540, which may include non-volatile memory, including, but not limited to, EEPROM, ROM, PROM, RAM, DRAM, SRAM, flash, magnetic disk drive, and/or optical disk drive. The storage device 2540 may comprise an internal storage device, an attached storage device, and/or a network accessible storage device, as non-limiting examples. The system 2500 may also include an encoder/decoder module 2530 configured to process data to provide encoded video and/or decoded video, and the encoder/decoder module 2530 may include its own processor and memory.

The encoder/decoder module 2530 represents the module(s) that may be included in a device to perform the encoding and/or decoding functions. As is known, such a device may include one or both of the encoding and decoding modules. Additionally, the encoder/decoder module 2530 may be implemented as a separate element of the system 2500 or may be incorporated within one or more processors 2510 as a combination of hardware and software as known to those skilled in the art.

Program code to be loaded onto one or more processors 2510 to perform the various processes described hereinabove may be stored in the storage device 2540 and subsequently loaded onto the memory 2520 for execution by the processors 2510. In accordance with the exemplary embodiments, one or more of the processor(s) 2510, the memory 2520, the storage device 2540, and the encoder/decoder module 2530 may store one or more of the various items during the performance of the processes discussed herein above, including, but not limited to the input video, the decoded video, the bitstream, equations, formulas, matrices, variables, operations, and operational logic.

The system 2500 may also include a communication interface 2550 that enables communication with other devices via a communication channel 2560. The communication interface 2550 may include, but is not limited to a transceiver configured to transmit and receive data from the communication channel 2560. The communication interface 2550 may include, but is not limited to, a modem or network card and the communication channel 2550 may be implemented within a wired and/or wireless medium. The various components of the system 2500 may be connected or communicatively coupled together (not shown in FIG. 25) using various suitable connections, including, but not limited to internal buses, wires, and printed circuit boards.

The exemplary embodiments may be carried out by computer software implemented by the processor 2510 or by hardware, or by a combination of hardware and software. As a non-limiting example, the exemplary embodiments may be implemented by one or more integrated circuits. The memory 2520 may be of any type appropriate to the technical environment and may be implemented using any appropriate data storage technology, such as optical memory devices, magnetic memory devices, semiconductor-based memory devices, fixed memory, and removable memory, as non-limiting examples. The processor 2510 may be of any type appropriate to the technical environment, and may encompass one or more of microprocessors, general purpose computers, special purpose computers, and processors based on a multi-core architecture, as non-limiting examples.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Furthermore, one skilled in the art may readily appreciate that the exemplary HEVC encoder 100 shown in FIG. 1 and the exemplary HEVC decoder shown in FIG. 3 may be modified according to the above teachings of the present disclosure in order to implement the disclosed improvements to the exiting HEVC standards for achieving better compression/decompression. For example, entropy coding 145, motion compensation 170, and motion estimation 175 in the exemplary encoder 100 of FIG. 1, and entropy decoding 330, and motion compensation 375, in the exemplary decoder of FIG. 3 may be modified according to the disclosed teachings to implement one or more exemplary aspects of the present disclosure including providing an enhanced affine merge prediction to the existing JEM.

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for video decoding, comprising:
   determining a predictor candidate for a block being decoded in a picture in an affine motion model, wherein the predictor candidate has a translational motion model and a plurality of sub-blocks comprising at least a top-left sub-block, a top-right sub-block, a bottom-left sub-block, and a bottom-right sub-block;
   determining for the predictor candidate, at least two control point generator motion vectors of an affine motion model, wherein each control point generator motion vector is associated to a different sub-block of the predictor candidate, provided that the at least two control point generator motion vectors determined for the predictor candidate are for the top-left sub-block and the top-right sub-block, respectively, and wherein motion vectors for the bottom-left sub-block and the bottom-right sub-block are compared to estimated motion vectors for the bottom-left sub-block and the bottom-right sub-block and satisfy a threshold level for respective angle and magnitude;
   determining corresponding control point motion vectors for the block being decoded based on the at least two control point generator motion vectors determined for the predictor candidate, such that the determined control point motion vectors reflect both motion per sub-block and the translational motion model of the predictor candidate;
   determining, based on the determined control point motion vectors, a corresponding motion field for the block, wherein the motion field identifies motion vectors used for prediction of sub-blocks of the block being decoded; and
   decoding the block based on the motion field.

2. The method of claim 1, wherein the predictor candidate is comprised in a set of predictor candidates and wherein determining the predictor candidate comprises receiving an index corresponding to the predictor candidate in the set of predictor candidates.

3. The method of claim 1, further comprising verifying that the determined control point motion vectors satisfy the affine motion model.

4. The method of claim 1, wherein determining the at least two control point generator motion vectors comprises:
   determining, for at least two distinct sets of at least three sub-blocks of the predictor candidate, corresponding control point motion vectors for the predictor candidate associated respectively to the at least two sets, based on the motion vectors associated respectively to the at least three sub-blocks of each set; and
   calculating corresponding control point motion vectors associated to the predictor candidate by averaging the determined control point motion vectors associated to each set.

5. The method of claim 1, wherein the motion vector is derived from at least one of:
   a bilateral template matching between two reference blocks in respectively two reference frames;
   a reference block of a reference frame identified by motion information of a first spatial neighboring block of the predictor candidate; or
   an average of motion vectors of spatial and temporal neighboring blocks of the predictor candidate.

6. A non-transitory computer readable storage medium having stored thereon instructions for decoding video data according to the method of claim 1.

7. An apparatus for video decoding, comprising a memory and at least one processor configured for:
   determining a predictor candidate for a block being decoded in a picture in an affine motion model, wherein the predictor candidate has a translational motion model and a plurality of sub-blocks comprising at least a top-left sub-block, a top-right sub-block, a bottom-left sub-block, and a bottom-right sub-block;
   determining for the predictor candidate, at least two control point generator motion vectors of an affine motion model, wherein each control point generator motion vector is associated to a different sub-block of the predictor candidate, provided that the at least two control point generator motion vectors determined for the predictor candidate are for the top-left sub-block and the top-right sub-block, respectively, and wherein motion vectors for the bottom-left sub-block and the bottom-right sub-block are compared to estimated motion vectors for the bottom-left sub-block and the bottom-right sub-block and satisfy a threshold level for respective angle and magnitude;
   determining corresponding control point motion vectors for the block being decoded based on the at least two control point generator motion vectors determined for the predictor candidate, such that the determined control point motion vectors reflect both motion per sub-block and the translational motion model of the predictor candidate;
   determining, based on the determined control point motion vectors, a corresponding motion field for the block, wherein the motion field identifies motion vectors used for prediction of sub-blocks of the block being decoded; and decoding the block based on the motion field.

8. The apparatus of claim 7, wherein the predictor candidate is comprised in a set of predictor candidates and wherein determining the predictor candidate comprises receiving an index corresponding to the predictor candidate in the set of predictor candidates.

9. The apparatus of claim 7, wherein the at least one processor is further configured for verifying that the determined control point motion vectors satisfy the affine motion model.

10. The apparatus of claim 7, wherein determining the at least two control point generator motion vectors comprises:
determining, for at least two distinct sets of at least three sub-blocks of the predictor candidate, corresponding control point motion vectors for the predictor candidate associated respectively to the at least two sets, based on the motion vectors associated respectively to the at least three sub-blocks of each set; and
calculating corresponding control point motion vectors associated to the predictor candidate by averaging the determined control point motion vectors associated to each set.

11. The apparatus of claim 7, wherein the motion vector is derived from at least one of:
a bilateral template matching between two reference blocks in respectively two reference frames;
a reference block of a reference frame identified by motion information of a first spatial neighboring block of the predictor candidate; or
an average of motion vectors of spatial and temporal neighboring blocks of the predictor candidate.

12. A method for video encoding, comprising:
determining a predictor candidate for a block being encoded in a picture in an affine motion model, wherein the predictor candidate has a translational motion model and a plurality of sub-blocks comprising at least a top-left sub-block, a top-right sub-block, a bottom-left sub-block, and a bottom-right sub-block;
determining for the predictor candidate, at least two control point generator motion vectors of an affine motion model, wherein each control point generator motion vector is associated to a different sub-block of the predictor candidate, provided that the at least two control point generator motion vectors determined for the predictor candidate are for the top-left sub-block and the top-right sub-block, respectively, and wherein motion vectors for the bottom-left sub-block and the bottom-right sub-block are compared to estimated motion vectors for the bottom-left sub-block and the bottom-right sub-block and satisfy a threshold level for respective angle and magnitude;
determining corresponding control point motion vectors for the block being encoded based on the at least two control point generator motion vectors determined for the predictor candidate, such that the determined control point motion vectors reflect both motion per sub-block and the translational motion model of the predictor candidate;
determining, based on the determined control point motion vectors, a corresponding motion field for the block, wherein the motion field identifies motion vectors used for prediction of sub-blocks of the block being encoded; and
encoding the block based on the motion field.

13. The encoding method of claim 12, wherein the predictor candidate is comprised in a set of predictor candidates, the encoding method further comprising:
encoding an index for the predictor candidate from the set of predictor candidates.

14. The method of claim 12, further comprising verifying that the determined control point motion vectors satisfy the affine motion model.

15. The method of claim 12, wherein determining the at least two control point generator motion vectors comprises:
determining, for at least two distinct sets of at least three sub-blocks of the predictor candidate, corresponding control point motion vectors for the predictor candidate associated respectively to the at least two sets, based on the motion vectors associated respectively to the at least three sub-blocks of each set; and
calculating corresponding control point motion vectors associated to the predictor candidate by averaging the determined control point motion vectors associated to each set.

16. The method of claim 12, wherein the motion vector is derived from at least one of:
a bilateral template matching between two reference blocks in respectively two reference frames;
a reference block of a reference frame identified by motion information of a first spatial neighboring block of the predictor candidate; or
an average of motion vectors of spatial and temporal neighboring blocks of the predictor candidate.

17. A non-transitory computer readable storage medium having stored thereon instructions for encoding video data according to the method of claim 12.

18. An apparatus for video encoding, comprising a memory and at least one processor configured for:
determining a predictor candidate for a block being encoded in a picture in an affine motion model, wherein the predictor candidate has a translational motion model and a plurality of sub-blocks comprising at least a top-left sub-block, a top-right sub-block, a bottom-left sub-block, and a bottom-right sub-block;
determining for the predictor candidate, at least two control point generator motion vectors of an affine motion model, wherein each control point generator motion vector is associated to a different sub-block of the predictor candidate, provided that the at least two control point generator motion vectors determined for the predictor candidate are for the top-left sub-block and the top-right sub-block respectively, and wherein motion vectors for the bottom-left sub-block and the bottom-right sub-block are compared to estimated motion vectors for the bottom-left sub-block and the bottom-right sub-block and satisfy a threshold level for respective angle and magnitude;
determining corresponding control point motion vectors for the block being encoded based on the at least two control point generator motion vectors determined for the predictor candidate, such that the determined control point motion vectors reflect both motion per sub-block and the translational motion model of the predictor candidate;
determining, based on the determined control point motion vectors, a corresponding motion field for the block, wherein the motion field identifies motion vectors used for prediction of sub-blocks of the block being encoded; and
encoding the block based on the motion field.

19. The apparatus of claim 18, wherein the predictor candidate is comprised in a set of predictor candidates, and the at least one processor is further configured for encoding an index for the predictor candidate from the set of predictor candidates.

20. The apparatus of claim 18, wherein the at least one processor is further configured for verifying that the one or more corresponding control point motion vectors associated to the predictor candidate satisfies the affine motion model.

21. The apparatus of claim 18, wherein determining the at least two control point generator motion vectors comprises:
   determining, for at least two distinct sets of at least three sub-blocks of the predictor candidate, corresponding control point motion vectors for the predictor candidate associated respectively to the at least two sets, based on the motion vectors associated respectively to the at least three sub-blocks of each set; and
   calculating corresponding control point motion vectors associated to the predictor candidate by averaging the determined control point motion vectors associated to each set.

22. The apparatus of claim 18, wherein the motion vector is derived from at least one of:
   a bilateral template matching between two reference blocks in respectively two reference frames;
   a reference block of a reference frame identified by motion information of a first spatial neighboring block of the predictor candidate; or
   an average of motion vectors of spatial and temporal neighboring blocks of the predictor candidate.

* * * * *